US012294270B2

(12) United States Patent
Amano et al.

(10) Patent No.: US 12,294,270 B2
(45) Date of Patent: May 6, 2025

(54) STATOR AND MOTOR HAVING COIL UNITS ANNULARLY ARRANGED

(71) Applicant: Murata Manufacturing Co., Ltd., Nagaokakyo (JP)

(72) Inventors: Hisato Amano, Nagaokakyo (JP); Mitsutoshi Natsumeda, Nagaokakyo (JP); Eiji Sakaguchi, Nagaokakyo (JP); Takashi Sakurada, Nagaokakyo (JP); Takahiro Sato, Nagaokakyo (JP); Masashi Uno, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 314 days.

(21) Appl. No.: 17/994,037

(22) Filed: Nov. 25, 2022

(65) Prior Publication Data

US 2023/0085682 A1 Mar. 23, 2023

Related U.S. Application Data

(63) Continuation of application No. PCT/JP2020/046518, filed on Dec. 14, 2020.

(30) Foreign Application Priority Data

May 26, 2020 (JP) .................. 2020-091535

(51) Int. Cl.
*H02K 3/52* (2006.01)
*H02K 21/16* (2006.01)

(52) U.S. Cl.
CPC ............. *H02K 3/522* (2013.01); *H02K 21/16* (2013.01); *H02K 2203/09* (2013.01); *H02K 2203/12* (2013.01)

(58) Field of Classification Search
CPC .... H02K 3/522; H02K 21/16; H02K 2203/09; H02K 2203/12
(Continued)

(56) References Cited

U.S. PATENT DOCUMENTS

| 12,057,736 B2 * | 8/2024 | Ichida ................. H02K 15/022 |
| 2020/0259385 A1 * | 8/2020 | Hishida ..................... H02K 3/46 |

(Continued)

FOREIGN PATENT DOCUMENTS

| JP | 2006246594 A | 9/2006 |
| JP | 2013110811 A | 6/2013 |
| JP | 2016013053 A | 1/2016 |

OTHER PUBLICATIONS

International Search Report in PCT/JP2020/046518, mailed Feb. 22, 2021, 2 pages.

*Primary Examiner* — Rashad H Johnson
(74) *Attorney, Agent, or Firm* — ArentFox Schiff LLP

(57) ABSTRACT

A device may include a coil unit assembly that includes a first, second, and third coil unit annularly arranged. Further, may include a busbar provided on an outer peripheral surface of the coil unit assembly, wherein when a direction in which an axis of the stator extends is defined as an axial direction, a direction which is orthogonal to the axial direction and in which outer peripheral surface and inner peripheral surface of the stator face each other is a radial direction, and a direction along an outer periphery of the stator when viewed from the axial direction is a circumferential direction, wherein the coil units each include a split core that includes a tooth that extends in the radial direction, an insulator mounted to overlap at least the tooth of the split core, and a coil that includes a winding wound around the tooth of the split core with the insulator interposed therebetween.

20 Claims, 11 Drawing Sheets

(58) Field of Classification Search
USPC .......................................................... 310/71
See application file for complete search history.

(56) References Cited

U.S. PATENT DOCUMENTS

| | | | |
|---|---|---|---|
| 2020/0280232 A1* | 9/2020 | Natsumeda | H02K 3/522 |
| 2020/0287437 A1* | 9/2020 | Suzuki | H02K 15/02 |
| 2021/0050757 A1* | 2/2021 | Kitano | H02K 3/325 |
| 2022/0166277 A1* | 5/2022 | Ogawa | H02K 3/522 |
| 2022/0166278 A1* | 5/2022 | Ogawa | H02K 15/095 |
| 2023/0036262 A1* | 2/2023 | Lee | H02K 3/522 |
| 2023/0291265 A1* | 9/2023 | Hasegawa | H02K 3/28 |
| 2023/0307976 A1* | 9/2023 | Hasegawa | H02K 3/325 |
| 2023/0318382 A1* | 10/2023 | Hijikata | H02K 3/28 |
| | | | 310/71 |
| 2023/0412028 A1* | 12/2023 | Kiba | H02K 3/47 |
| 2024/0258856 A1* | 8/2024 | Niwa | H02K 1/2798 |
| 2024/0339883 A1* | 10/2024 | Yamada | H02K 3/34 |

\* cited by examiner

STATOR AND MOTOR HAVING COIL UNITS ANNULARLY ARRANGED

CROSS REFERENCE TO RELATED APPLICATIONS

This application is a continuation of International Application No. PCT/JP2020/046518, filed Dec. 14, 2020, which claims priority to Japanese Patent Application No. JP 2020-091535, filed May 26, 2020, the entire contents of each of which are hereby incorporated in their entirety.

TECHNICAL FIELD

The present disclosure is directed to a stator and a motor.

BACKGROUND OF THE INVENTION

Japanese Unexamined Patent Application Publication No. 2016-13053 (hereinafter "JP '053") describes, for example, an armature including a stator core including a plurality of teeth provided at even intervals in the circumferential direction, a winding wound around each tooth, and a busbar configured to connect predetermined windings to each other to form a parallel circuit including the windings in the same phase, in which the at least two windings adjacent to each other in the circumferential direction each include a single conducting wire, and a crossing wire including a conducting wire stretched between the at least two windings is connected to the busbar.

With the armature described in JP '053, the number of connection points between the windings and the busbars can be small. Further, in the armature described in JP '053, however, the busbars are provided above the windings in the axial direction as illustrated in FIG. 1 of JP '053, and hence the armature tends to be thick in the axial direction.

SUMMARY OF THE INVENTION

According to an exemplary aspect of the disclosure, a stator and a motor are thinned in the axial direction.

A stator according to the present disclosure includes: a coil unit assembly that includes coil units annularly arranged; and a busbar provided on an outer peripheral surface of the coil unit assembly. When a direction in which an axis of the stator extends is defined as an axial direction, a direction which is orthogonal to the axial direction and in which outer peripheral surface and inner peripheral surface of the stator face each other is defined as a radial direction, and a direction along an outer periphery of the stator when viewed from the axial direction is defined as a circumferential direction, the coil units each include a split core that includes a tooth that extends in the radial direction, an insulator mounted to overlap at least the tooth of the split core, and a coil that includes a winding wound around the tooth of the split core with the insulator interposed therebetween. The coil units include a first coil unit, a second coil unit, and a third coil unit annularly and repeatedly arranged in sequence along the circumferential direction. The first coil unit includes a first split core, a first insulator, and a first coil that includes a U-phase winding. The second coil unit includes a second split core, a second insulator, and a second coil that includes a V-phase winding. The third coil unit includes a third split core, a third insulator, and a third coil that includes a W-phase winding. An outer end surface on an opposite side of the tooth in the radial direction of each of the first insulator, the second insulator, and the third insulator is exposed on the outer peripheral surface of the coil unit assembly. The outer end surface of each of the first insulator, the second insulator, and the third insulator is provided with a first groove, a second groove, and a third groove that extend in the circumferential direction over the first insulator, the second insulator, and the third insulator and are different from each other in position in the axial direction. The U-phase winding has a first end portion drawn toward one end in the circumferential direction of the first groove of the first insulator and a second end portion drawn toward one end in the circumferential direction of the second groove of the first insulator. The V-phase winding has a first end portion drawn toward one end in the circumferential direction of the second groove of the second insulator and a second end portion drawn toward one end in the circumferential direction of the third groove of the second insulator. The W-phase winding has a first end portion drawn toward one end in the circumferential direction of the third groove of the third insulator and a second end portion drawn toward one end in the circumferential direction of the first groove of the third insulator. The busbar includes a first busbar provided in the first groove, a second busbar provided in the second groove, and a third busbar provided in the third groove. The second end portion of the W-phase winding and the first end portion of the U-phase winding are adjacent to each other in the circumferential direction and electrically connected to each other by the first busbar. The second end portion of the U-phase winding and the first end portion of the V-phase winding are adjacent to each other in the circumferential direction and electrically connected to each other by the second busbar. The second end portion of the V-phase winding and the first end portion of the W-phase winding are adjacent to each other in the circumferential direction and electrically connected to each other by the third busbar. The U-phase winding, the V-phase winding, and the W-phase winding form a delta connection with parallel circuits in respective phases.

A motor according to the present disclosure includes the stator of the present disclosure and a rotor provided to face an inner peripheral surface of the stator.

According to the present disclosure, it is possible to provide the stator and the motor that can be thinned in the axial direction.

Additional advantages and novel features of the system of the present disclosure will be set forth in part in the description that follows, and in part will become more apparent to those skilled in the art upon examination of the following or upon learning by practice of the disclosure.

BRIEF DESCRIPTION OF DRAWINGS

In the descriptions that follow, like parts are marked throughout the specification and drawings with the same numerals, respectively. The drawings are not necessarily drawn to scale and certain drawings may be shown in exaggerated or generalized form in the interest of clarity and conciseness. The disclosure itself, however, as well as a mode of use, further features and advances thereof, will be understood by reference to the following detailed description of illustrative implementations of the disclosure when read in conjunction with reference to the accompanying drawings, wherein.

DETAILED DESCRIPTION

Figure 1:
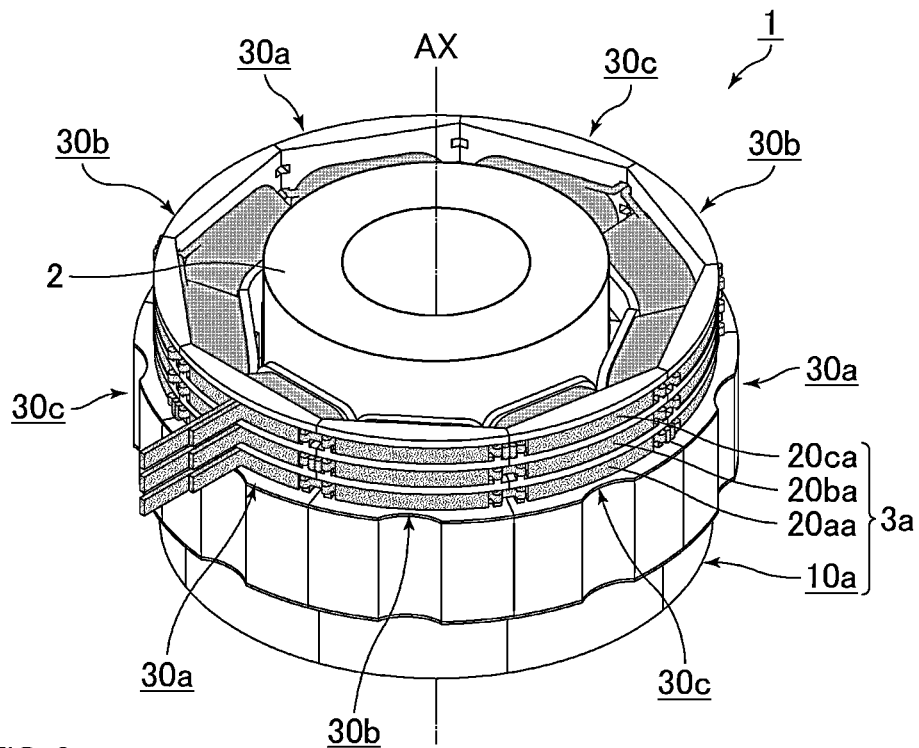
FIG. 1 is a schematic perspective view illustrating a motor in accordance with aspects of the present disclosure.

A stator of the present disclosure and a motor of the present disclosure are described below. Note that the present disclosure is not limited to the following configurations and may be appropriately modified in a range not departing from the gist of the present invention. Further, the combination of a plurality of individual preferred configurations described below is also included in the present disclosure.

Each aspect described below is exemplary, and it goes without saying that the configurations described in the different aspects can be partially replaced or combined. In different aspects the description of matters common to the same aspects are omitted, and differences from aspects are mainly described. In particular, similar actions and effects provided by similar configurations are not described one by one in each aspect. In the following description, when each aspect is not particularly distinguished from the other aspect, a stator and a motor of each aspects are simply referred to as "the stator of the present disclosure" and "the motor of the present disclosure."

A stator of the present disclosure includes: a coil unit assembly that includes coil units annularly arranged; and a busbar provided on an outer peripheral surface of the coil unit assembly. When a direction in which an axis of the stator extends is defined as an axial direction, a direction which is orthogonal to the axial direction and in which outer peripheral surface and inner peripheral surface of the stator face each other is defined as a radial direction, and a direction along an outer periphery of the stator when viewed from the axial direction is defined as a circumferential direction, the coil units each include a split core that includes a tooth that extends in the radial direction, an insulator mounted to overlap at least the tooth of the split core, and a coil that includes a winding wound around the tooth of the split core with the insulator interposed therebetween. The coil units include a first coil unit, a second coil unit, and a third coil unit annularly and repeatedly arranged in sequence along the circumferential direction. The first coil unit includes a first split core, a first insulator, and a first coil that includes a U-phase winding. The second coil unit includes a second split core, a second insulator, and a second coil that includes a V-phase winding. The third coil unit includes a third split core, a third insulator, and a third coil that includes a W-phase winding. An outer end surface on an opposite side of the tooth in the radial direction of each of the first insulator, the second insulator, and the third insulator is exposed on the outer peripheral surface of the coil unit assembly. The outer end surface of each of the first insulator, the second insulator, and the third insulator is provided with a first groove, a second groove, and a third groove that extend in the circumferential direction over the first insulator, the second insulator, and the third insulator and are different from each other in position in the axial direction. The U-phase winding has a first end portion drawn toward one end in the circumferential direction of the first groove of the first insulator and a second end portion drawn toward one end in the circumferential direction of the second groove of the first insulator. The V-phase winding has a first end portion drawn toward one end in the circumferential direction of the second groove of the second insulator and a second end portion drawn toward one end in the circumferential direction of the third groove of the second insulator. The W-phase winding has a first end portion drawn toward one end in the circumferential direction of the third groove of the third insulator and a second end portion drawn toward one end in the circumferential direction of the first groove of the third insulator. The busbar includes a first busbar provided in the first groove, a second busbar provided in the second groove, and a third busbar provided in the third groove. The second end portion of the W-phase winding and the first end portion of the U-phase winding are adjacent to each other in the circumferential direction and electrically connected to each other by the first busbar. The second end portion of the U-phase winding and the first end portion of the V-phase winding are adjacent to each other in the circumferential direction and electrically connected to each other by the second busbar. The second end portion of the V-phase winding and the first end portion of the W-phase winding are adjacent to each other in the circumferential direction and electrically connected to each other by the third busbar. The U-phase winding, the V-phase winding, and the W-phase winding form a delta connection with parallel circuits in respective phases.

A motor of the present disclosure includes the stator of the present disclosure and a rotor provided to face an inner peripheral surface of the stator.

In the stator of the present disclosure, the busbar may have a pair of bent portions adjacent to each other in the circumferential direction, and end portions of two of the windings adjacent to each other in the circumferential direction may be sandwiched by the pair of bent portions in the circumferential direction. An example of such a case is described below as a stator according an aspect of the present disclosure. Further, a motor including the stator according to an aspect of the present disclosure is described below as a motor according to an aspect of the present disclosure.

FIG. 1 is a schematic perspective view illustrating the motor according to an aspect of the present disclosure.

As illustrated in FIG. 1, a motor 1 includes a rotor 2 and a stator 3a. More specifically, in the motor 1, with an axis AX being a reference, the rotor 2 is located coaxially inside and the stator 3a is located coaxially outside. The axis AX corresponds to the axis of rotation of the rotor 2.

Herein, the direction in which the axis of the stator extends is defined as an axial direction. Further, the direction which is orthogonal to the axial direction and in which the outer peripheral surface and inner peripheral surface of the stator face each other is defined as a radial direction. Moreover, the direction along the outer periphery of the stator when viewed from the axial direction is defined as a circumferential direction. Note that the axial direction, radial direction, and circumferential direction of the stator correspond to the axial direction, radial direction, and circumferential direction of a coil unit assembly described later, respectively.

The rotor 2 is provided to face the inner peripheral surface of the stator 3a.

The rotor 2 includes, for example, annular electrical steel sheets stacked in the axial direction. When viewed from the axial direction, the rotor 2 may have a substantially circular ring shape or a substantially polygonal ring shape.

The outer peripheral surface of the rotor 2 is provided with permanent magnets with the N poles and the S poles alternately arranged along the circumferential direction.

The stator 3a includes a coil unit assembly 10a, a first busbar 20aa, a second busbar 20ba, and a third busbar 20ca.

The coil unit assembly 10a includes a first coil unit 30a, a second coil unit 30b, and a third coil unit 30c annularly and repeatedly arranged in sequence along the circumferential direction.

Figure 2:
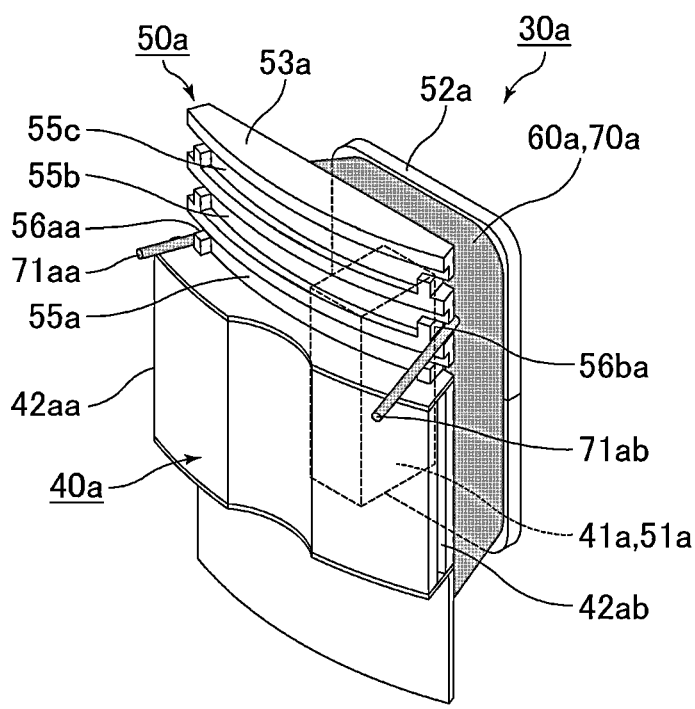
FIG. 2 is a schematic perspective view illustrating a first coil unit.
Figure 3:
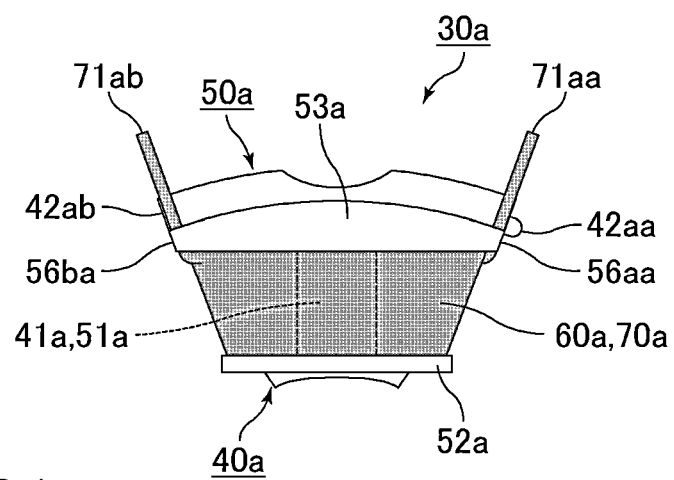
FIG. 3 is a schematic plan view illustrating the first coil unit illustrated in FIG. 2 when viewed from the axial direction.
Figure 4:
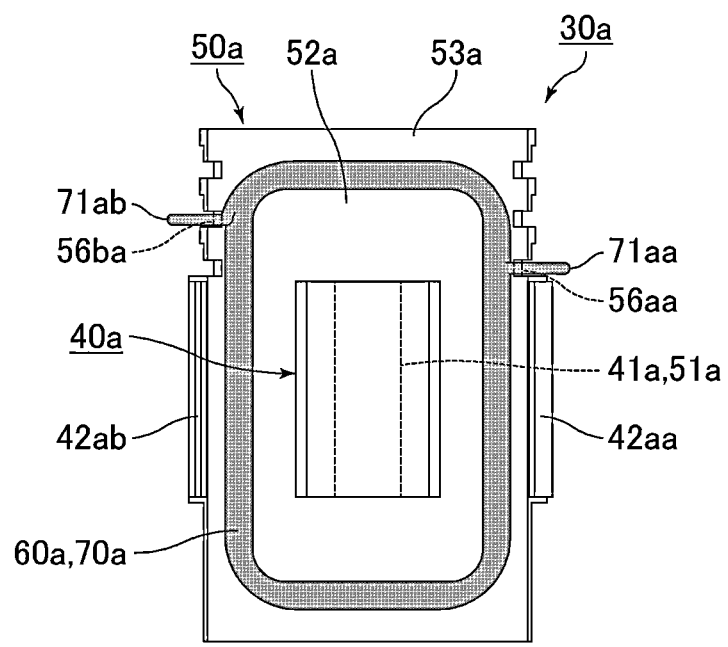
FIG. 4 is a schematic plan view illustrating the first coil unit illustrated in FIG. 2 when viewed from the radial direction.

FIG. 2 is a schematic perspective view illustrating the first coil unit. FIG. 3 is a schematic plan view illustrating the first coil unit illustrated in FIG. 2 when viewed from the axial direction. FIG. 4 is a schematic plan view illustrating the first coil unit illustrated in FIG. 2 when viewed from the radial direction.

As illustrated in FIG. 2, FIG. 3, and FIG. 4, the first coil unit 30a includes a first split core 40a, a first insulator 50a, and a first coil 60a.

The first split core 40a and the first insulator 50a are described below with reference also to FIG. 5 and FIG. 6.

Figure 5:
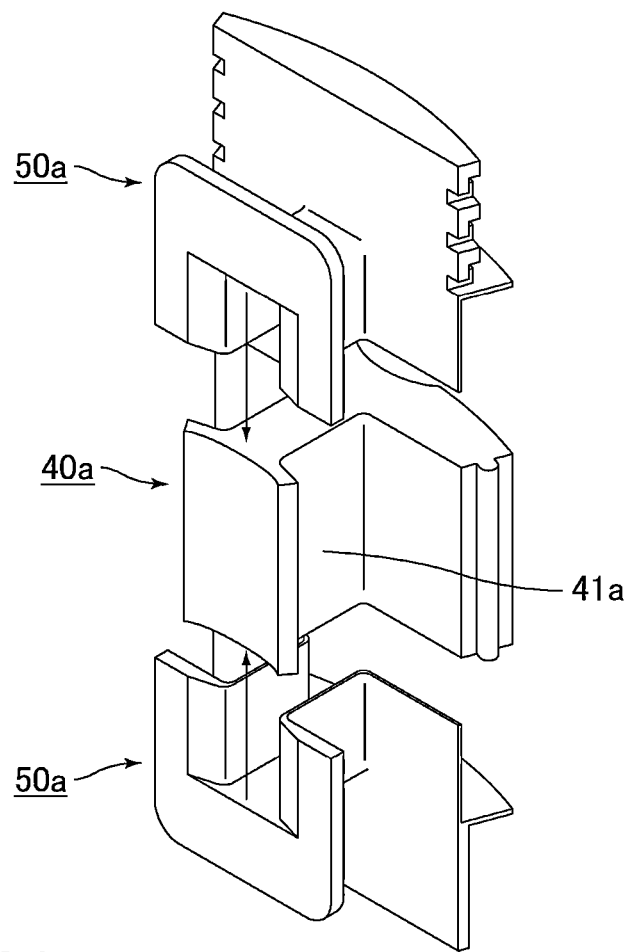
FIG. 5 is a schematic perspective view illustrating the state before a first insulator is mounted on a first split core.

FIG. 5 is a schematic perspective view illustrating the state before the first insulator is mounted on the first split core. FIG. 6 is a schematic perspective view illustrating the state after the first insulator is mounted on the first split core.

As illustrated in FIG. 5, the first split core 40a includes a tooth 41a extending in the radial direction.

As illustrated in FIG. 5, the first insulator 50a before being mounted on the first split core 40a is isolated into two isolated portions. Then, the first insulator 50a is mounted on the first split core 40a with the two isolated portions sandwiching the first split core 40a in the axial direction. With this, the first insulator 50a is mounted to overlap at least the tooth 41a of the first split core 40a.

The two isolated portions of the first insulator 50a may sandwich the first split core 40a in the axial direction with no gap or sandwich the first split core 40a in the axial direction with gaps. When the two isolated portions of the first insulator 50a sandwich the first split core 40a in the axial direction with no gap, the first insulator 50a overlaps the approximately the entire surface of the tooth 41a, and hence the surface of the tooth 41a is not exposed from the first insulator 50a. On the other hand, when the two isolated portions of the first insulator 50a sandwich the first split core 40a in the axial direction with gaps, the first insulator 50a overlaps part of the surface of the tooth 41a, and hence the surface of the tooth 41a is exposed from the first insulator 50a.

The first insulator 50a may be mounted on the first split core 40a with the two isolated portions sandwiching the first split core 40a in the circumferential direction. Further, the first insulator 50a before being mounted on the first split core 40a may be isolated into three or more isolated portions.

Figure 6:
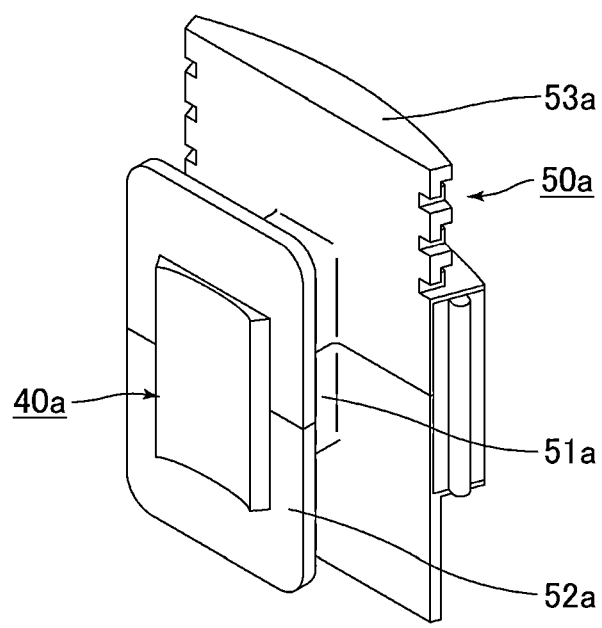
FIG. 6 is a schematic perspective view illustrating the state after the first insulator is mounted on the first split core.

As illustrated in FIG. 6, the first insulator 50a after being mounted on the first split core 40a includes a cylindrical portion 51a, an inner flange portion 52a, and an outer flange portion 53a. The cylindrical portion 51a overlaps the tooth 41a and, more specifically, surrounds the tooth 41a. The inner flange portion 52a extends in the axial direction and the circumferential direction from the inner edge, located on the inner peripheral surface side of the coil unit assembly 10a, of the cylindrical portion 51a. The outer flange portion 53a extends in the axial direction and the circumferential direction from the outer edge, located on the outer peripheral surface side of the coil unit assembly 10a, of the cylindrical portion 51a.

In the state after the first insulator 50a is mounted on the first split core 40a, the first split core 40a is exposed from the inner flange portion 52a and the outer flange portion 53a. As illustrated in FIG. 2, FIG. 3, and FIG. 4, the exposed portion of the first split core 40a exposed from the outer flange portion 53a has, as two end surfaces facing each other in the circumferential direction, an end surface 42aa protruded and an end surface 42ab depressed.

The outer end surface on the opposite side of the tooth 41a in the radial direction of the first insulator 50a is exposed on the outer peripheral surface of the coil unit assembly 10a. As illustrated in FIG. 2, the outer end surface on the opposite side of the tooth 41a in the radial direction of the first insulator 50a, specifically, the upper outer end surface in the axial direction of the outer flange portion 53a herein is provided with a first groove 55a, a second groove 55b, and a third groove 55c. The first groove 55a, the second groove 55b, and the third groove 55c extend in the circumferential direction and are different from each other in position in the axial direction.

As illustrated in FIG. 2, FIG. 3, and FIG. 4, the first coil 60a includes a U-phase winding 70a wound around the tooth 41a of the first split core 40a with the first insulator 50a, specifically, the cylindrical portion 51a herein interposed therebetween.

A first end portion 71aa of the U-phase winding 70a is drawn toward one end 56aa in the circumferential direction of the first groove 55a of the first insulator 50a. The first end portion 71aa of the U-phase winding 70a corresponds to the winding start portion of the U-phase winding 70a.

A second end portion 71ab of the U-phase winding 70a is drawn toward one end 56ba in the circumferential direction of the second groove 55b of the first insulator 50a. The second end portion 71ab of the U-phase winding 70a corresponds to the winding end portion of the U-phase winding 70a.

Figure 7:
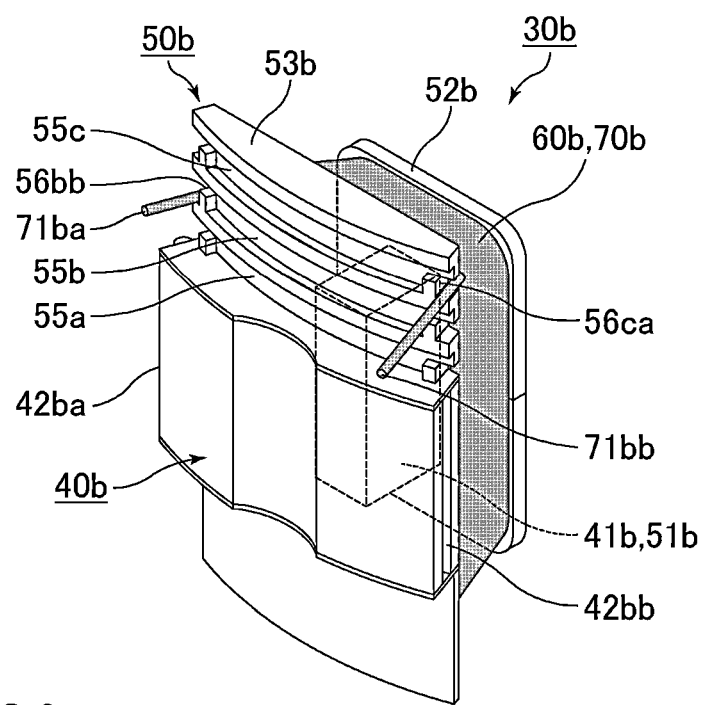
FIG. 7 is a schematic perspective view illustrating a second coil unit.
Figure 8:
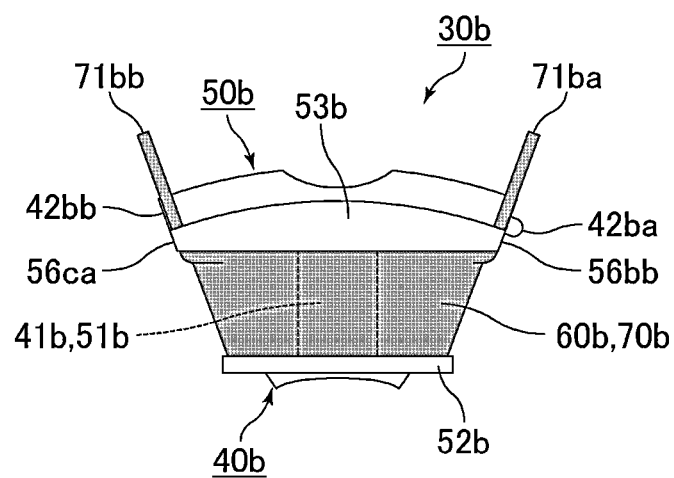
FIG. 8 is a schematic plan view illustrating the second coil unit illustrated in FIG. 7 when viewed from the axial direction.
Figure 9:
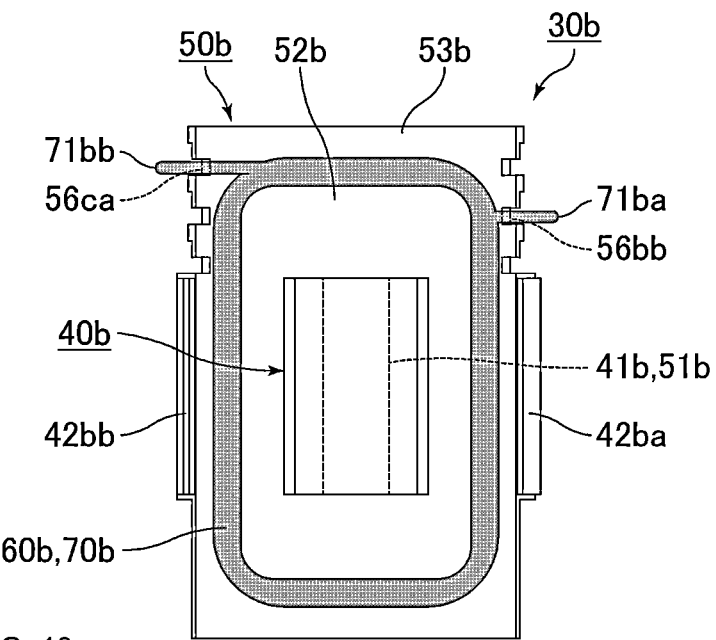
FIG. 9 is a schematic plan view illustrating the second coil unit illustrated in FIG. 7 when viewed from the radial direction.

FIG. 7 is a schematic perspective view illustrating a second coil unit. FIG. 8 is a schematic plan view illustrating the second coil unit illustrated in FIG. 7 when viewed from the axial direction. FIG. 9 is a schematic plan view illustrating the second coil unit illustrated in FIG. 7 when viewed from the radial direction.

As illustrated in FIG. 7, FIG. 8, and FIG. 9, the second coil unit 30b includes a second split core 40b, a second insulator 50b, and a second coil 60b.

The states before and after the second insulator 50b is mounted on the second split core 40b are similar to the respective states illustrated in FIG. 5 and FIG. 6. That is, the second split core 40b includes a tooth 41b extending in the radial direction. Further, the second insulator 50b after being mounted on the second split core 40b includes a cylindrical portion 51b, an inner flange portion 52b, and an outer flange portion 53b. The cylindrical portion 51b overlaps the tooth 41b and, more specifically, surrounds the tooth 41b. The inner flange portion 52b extends in the axial direction and the circumferential direction from the inner edge, located on the inner peripheral surface side of the coil unit assembly 10a, of the cylindrical portion 51b. The outer flange portion 53b extends in the axial direction and the circumferential direction from the outer edge, located on the outer peripheral surface side of the coil unit assembly 10a, of the cylindrical portion Mb.

In the state after the second insulator 50b is mounted on the second split core 40b, the second split core 40b is exposed from the inner flange portion 52b and the outer flange portion 53b. As illustrated in FIG. 7, FIG. 8, and FIG. 9, the exposed portion of the second split core 40b exposed from the outer flange portion 53b has, as two end surfaces facing each other in the circumferential direction, an end surface 42ba protruded and an end surface 42bb depressed.

The outer end surface on the opposite side of the tooth 41b in the radial direction of the second insulator 50b is exposed on the outer peripheral surface of the coil unit assembly 10a. As illustrated in FIG. 7, the outer end surface on the opposite side of the tooth 41b in the radial direction of the second insulator 50b, specifically, the upper outer end surface in the axial direction of the outer flange portion 53b herein is provided with the first groove 55a, the second groove 55b, and the third groove 55c like the first insulator 50a.

As illustrated in FIG. 7, FIG. 8, and FIG. 9, the second coil 60b includes a V-phase winding 70b wound around the tooth 41b of the second split core 40b with the second insulator 50b, specifically, the cylindrical portion 51b herein interposed therebetween.

A first end portion 71ba of the V-phase winding 70b is drawn toward one end 56bb in the circumferential direction of the second groove 55b of the second insulator 50b. The first end portion 71ba of the V-phase winding 70b corresponds to the winding start portion of the V-phase winding 70b.

A second end portion 71bb of the V-phase winding 70b is drawn toward one end 56ca in the circumferential direction of the third groove 55c of the second insulator 50b. The second end portion 71bb of the V-phase winding 70b corresponds to the winding end portion of the V-phase winding 70b.

Figure 10:
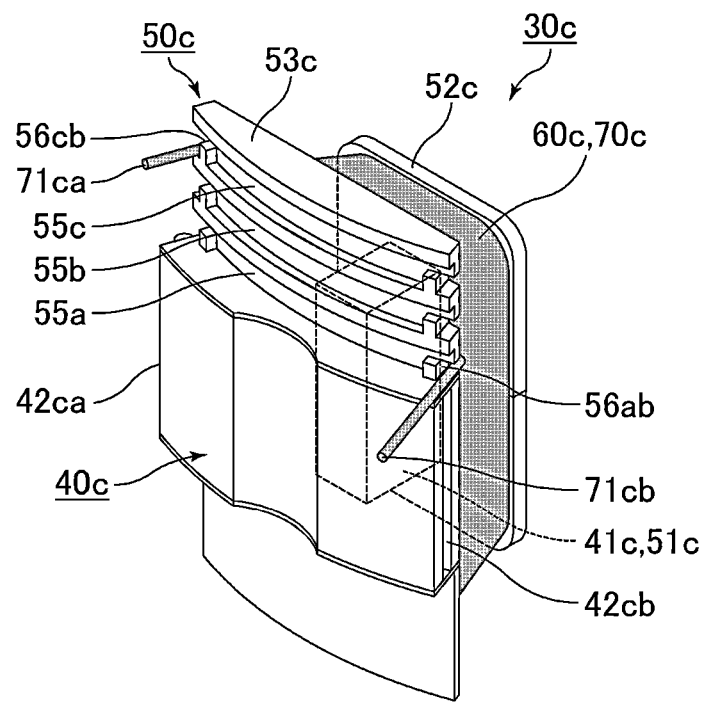
FIG. 10 is a schematic perspective view illustrating a third coil unit.
Figure 11:
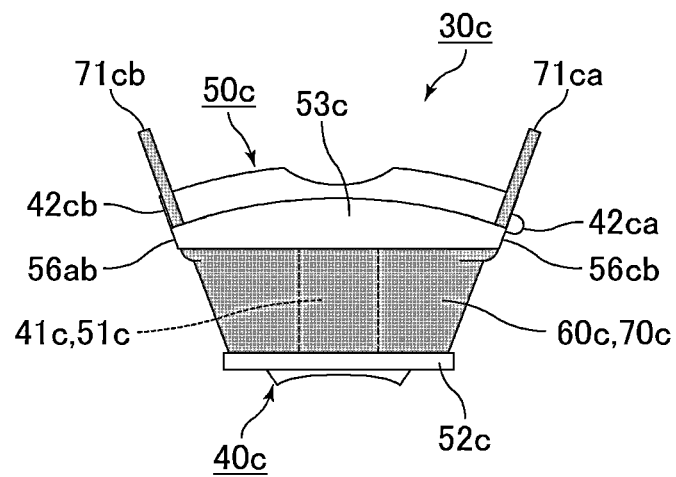
FIG. 11 is a schematic plan view illustrating the third coil unit illustrated in FIG. 10 when viewed from the axial direction.
Figure 12:
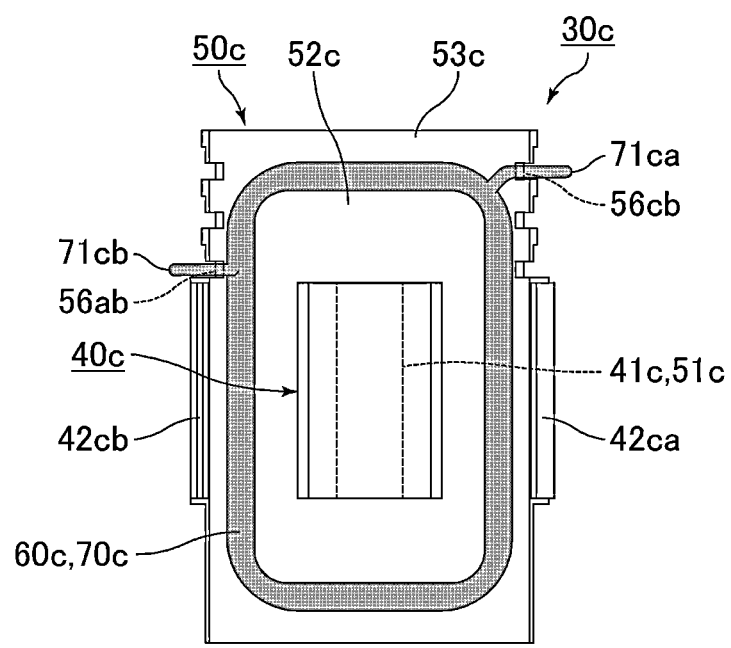
FIG. 12 is a schematic plan view illustrating the third coil unit illustrated in FIG. 10 when viewed from the radial direction.

FIG. 10 is a schematic perspective view illustrating a third coil unit. FIG. 11 is a schematic plan view illustrating the third coil unit illustrated in FIG. 10 when viewed from the axial direction. FIG. 12 is a schematic plan view illustrating the third coil unit illustrated in FIG. 10 when viewed from the radial direction.

As illustrated in FIG. 10, FIG. 11, and FIG. 12, the third coil unit 30c includes a third split core 40c, a third insulator 50c, and a third coil 60c.

The states before and after the third insulator 50c is mounted on the third split core 40c are similar to the respective states illustrated in FIG. 5 and FIG. 6. That is, the third split core 40c includes a tooth 41c extending in the radial direction. Further, the third insulator 50c after being mounted on the third split core 40c includes a cylindrical portion 51c, an inner flange portion 52c, and an outer flange portion 53c. The cylindrical portion 51c overlaps the tooth 41c and, more specifically, surrounds the tooth 41c. The inner flange portion 52c extends in the axial direction and the circumferential direction from the inner edge, located on the inner peripheral surface side of the coil unit assembly 10a, of the cylindrical portion 51c. The outer flange portion 53c extends in the axial direction and the circumferential direction from the outer edge, located on the outer peripheral surface side of the coil unit assembly 10a, of the cylindrical portion 51c.

In the state after the third insulator 50c is mounted on the third split core 40c, the third split core 40c is exposed from the inner flange portion 52c and the outer flange portion 53c. As illustrated in FIG. 10, FIG. 11, and FIG. 12, the exposed portion of the third split core 40c exposed from the outer flange portion 53c has, as two end surfaces facing each other in the circumferential direction, an end surface 42ca protruded and an end surface 42cb depressed.

The outer end surface on the opposite side of the tooth 41c in the radial direction of the third insulator 50c is exposed on the outer peripheral surface of the coil unit assembly 10a. As illustrated in FIG. 10, the outer end surface on the opposite side of the tooth 41c in the radial direction of the third insulator 50c, specifically, the upper outer end surface in the axial direction of the outer flange portion 53c herein is provided with the first groove 55a, the second groove 55b, and the third groove 55c like the first insulator 50a and the second insulator 50b.

As illustrated in FIG. 10, FIG. 11, and FIG. 12, the third coil 60c includes a W-phase winding 70c wound around the tooth 41c of the third split core 40c with the third insulator 50c, specifically, the cylindrical portion 51c herein interposed therebetween.

A first end portion 71ca of the W-phase winding 70c is drawn toward one end 56cb in the circumferential direction of the third groove 55c of the third insulator 50c. The first end portion 71ca of the W-phase winding 70c corresponds to the winding start portion of the W-phase winding 70c.

A second end portion 71cb of the W-phase winding 70c is drawn toward one end 56ab in the circumferential direction of the first groove 55a of the third insulator 50c. The second end portion 71*cb* of the W-phase winding 70*c* corresponds to the winding end portion of the W-phase winding 70*c*.

The first coil unit 30*a*, the second coil unit 30*b*, and the third coil unit 30*c* have the respective configurations as described above, and hence each coil unit is more easily handled.

The first split core 40*a*, the second split core 40*b*, and the third split core 40*c* each include, for example, electrical steel sheets stacked in the axial direction.

The first insulator 50*a*, the second insulator 50*b*, and the third insulator 50*c* each include, for example, an insulating resin.

The U-phase winding 70*a*, the V-phase winding 70*b*, and the W-phase winding 70*c* are wound in the same direction and may be wound counterclockwise or clockwise when viewed from the radial direction as illustrated in FIG. 4, FIG. 9, and FIG. 12.

The first coil unit 30*a*, the second coil unit 30*b*, and the third coil unit 30*c* are annularly and repeatedly joined to each other in sequence along the circumferential direction with the respective end surfaces in the circumferential direction of the exposed portion of the first split core 40*a*, the exposed portion of the second split core 40*b*, and the exposed portion of the third split core 40*c* fitted to each other. More specifically, the end surface 42*ab* of the exposed portion of the first split core 40*a* and the end surface 42*ba* of the exposed portion of the second split core 40*b* are fitted to each other, the end surface 42*bb* of the exposed portion of the second split core 40*b* and the end surface 42*ca* of the exposed portion of the third split core 40*c* are fitted to each other, and the end surface 42*cb* of the exposed portion of the third split core 40*c* and the end surface 42*aa* of the exposed portion of the first split core 40*a* are fitted to each other. Instead of such a joining mode, the end portions in the circumferential direction of the outer peripheral surfaces of the first coil unit 30*a*, the second coil unit 30*b*, and the third coil unit 30*c* may be joined to each other by joining members.

Figure 13:
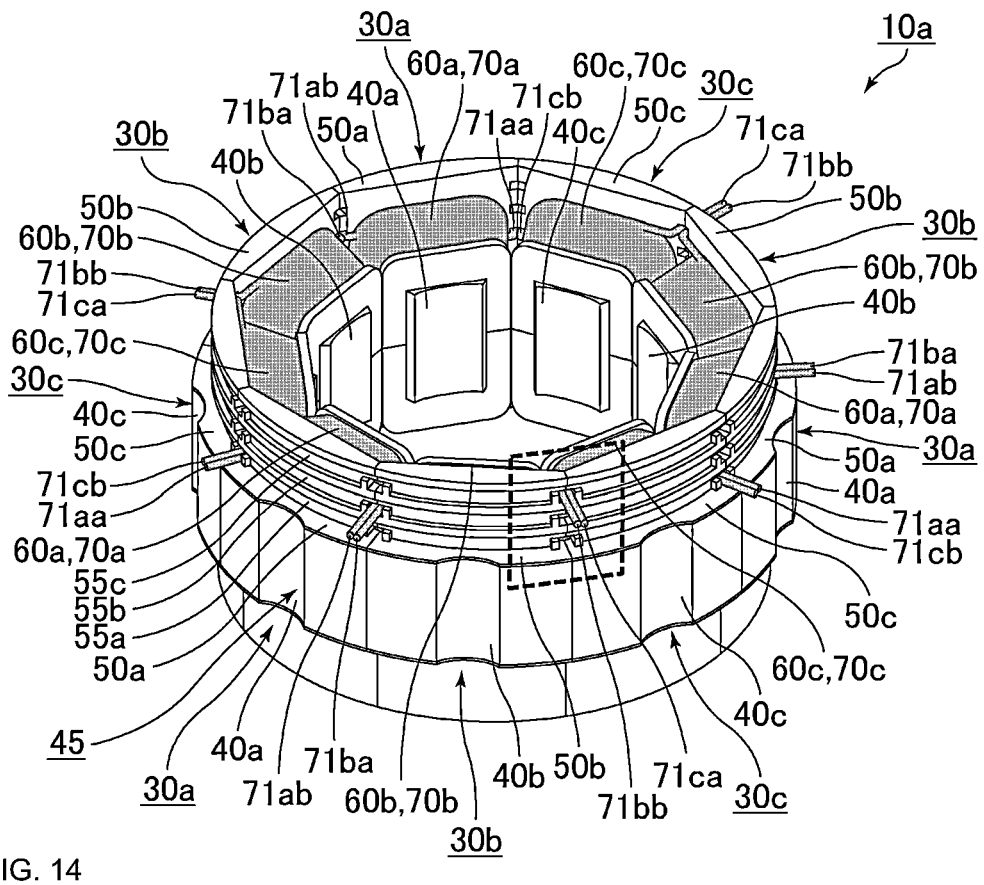
FIG. 13 is a schematic perspective view illustrating a coil unit assembly in which the first coil unit illustrated in FIG. 2, the second coil unit illustrated in FIG. 7, and the third coil unit illustrated in FIG. 10 are annularly and repeatedly arranged in sequence along the circumferential direction.

In the manner as described above, the first coil unit 30*a*, the second coil unit 30*b*, and the third coil unit 30*c* are annularly and repeatedly arranged in sequence along the circumferential direction, to thereby form the coil unit assembly 10*a* as illustrated in FIG. 13. FIG. 13 is a schematic perspective view illustrating the coil unit assembly in which the first coil unit illustrated in FIG. 2, the second coil unit illustrated in FIG. 7, and the third coil unit illustrated in FIG. 10 are annularly and repeatedly arranged in sequence along the circumferential direction.

In the coil unit assembly 10*a*, the number of each of the first coil units 30*a*, the second coil units 30*b*, and the third coil units 30*c*, which is three, may be one, two, or four or more.

In the coil unit assembly 10*a*, the first split core 40*a*, the second split core 40*b*, and the third split core 40*c* are annularly and repeatedly arranged in sequence along the circumferential direction, to thereby form a stator core 45.

On the outer peripheral surface of the coil unit assembly 10*a*, the first groove 55*a*, the second groove 55*b*, and the third groove 55*c* extend in the circumferential direction over the first insulator 50*a*, the second insulator 50*b*, and the third insulator 50*c*. That is, the positions in the axial direction of the first groove 55*a* on the first insulator 50*a*, the second insulator 50*b*, and the third insulator 50*c* are the same. Further, the positions in the axial direction of the second groove 55*b* on the first insulator 50*a*, the second insulator 50*b*, and the third insulator 50*c* are the same. Moreover, the positions in the axial direction of the third groove 55*c* on the first insulator 50*a*, the second insulator 50*b*, and the third insulator 50*c* are the same.

On the coil unit assembly 10*a*, the first groove 55*a*, the second groove 55*b*, and the third groove 55*c* are arranged in order from the bottom to the top in the axial direction, more specifically, in order from the stator core 45 side, and different from each other in position in the axial direction. The first groove 55*a*, the second groove 55*b*, and the third groove 55*c* may be arranged in an order different from that of FIG. 13 as long as being different from each other in position in the axial direction.

On the coil unit assembly 10*a*, the second end portion 71*cb* of the W-phase winding 70*c* and the first end portion 71*aa* of the U-phase winding 70*a* are adjacent to each other in the circumferential direction. The second end portion 71*cb* of the W-phase winding 70*c* and the first end portion 71*aa* of the U-phase winding 70*a* may be in contact with each other but are not necessarily in contact with each other. The second end portion 71*cb* of the W-phase winding 70*c* and the first end portion 71*aa* of the U-phase winding 70*a* may be connected to each other by soldering or welding, for example.

On the coil unit assembly 10*a*, the second end portion 71*ab* of the U-phase winding 70*a* and the first end portion 71*ba* of the V-phase winding 70*b* are adjacent to each other in the circumferential direction. The second end portion 71*ab* of the U-phase winding 70*a* and the first end portion 71*ba* of the V-phase winding 70*b* may be in contact with each other but are not necessarily in contact with each other. The second end portion 71*ab* of the U-phase winding 70*a* and the first end portion 71*ba* of the V-phase winding 70*b* may be connected to each other by soldering or welding, for example.

On the coil unit assembly 10*a*, the second end portion 71*bb* of the V-phase winding 70*b* and the first end portion 71*ca* of the W-phase winding 70*c* are adjacent to each other in the circumferential direction. The second end portion 71*bb* of the V-phase winding 70*b* and the first end portion 71*ca* of the W-phase winding 70*c* may be in contact with each other but are not necessarily in contact with each other. The second end portion 71*bb* of the V-phase winding 70*b* and the first end portion 71*ca* of the W-phase winding 70*c* may be connected to each other by soldering or welding, for example.

Figure 14:
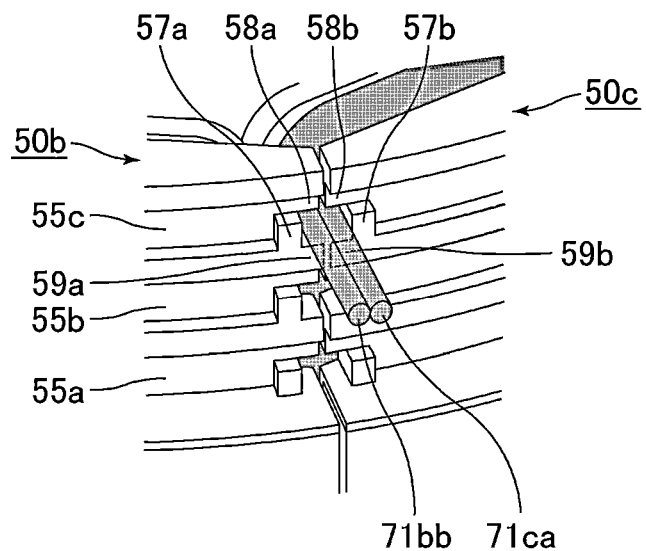
FIG. 14 is a schematic perspective view illustrating the region surrounded by the dotted line in FIG. 13 in an enlarged manner.

FIG. 14 is a schematic perspective view illustrating the region surrounded by the dotted line in FIG. 13 in an enlarged manner.

The second insulator 50*b* is preferably provided with circumferential positioning means for performing positioning in the circumferential direction of the second end portion 71*bb* of the V-phase winding 70*b*. As illustrated in FIG. 14, the second insulator 50*b* is provided with, as exemplary circumferential positioning means, a wall portion 57*a* in contact with the side on the opposite side of the third insulator 50*c* in the circumferential direction of the second end portion 71*bb* of the V-phase winding 70*b*. With the second insulator 50*b* provided with the wall portion 57*a*, the position on the opposite side of the third insulator 50*c* in the circumferential direction of the second end portion 71*bb* of the V-phase winding 70*b* is determined, and hence the drawn position in the circumferential direction of the second end portion 71*bb* of the V-phase winding 70*b* is more easily determined.

The third insulator 50*c* is preferably provided with circumferential positioning means for performing positioning in the circumferential direction of the first end portion 71*ca* of the W-phase winding 70c. As illustrated in FIG. 14, the third insulator 50c is provided with, as exemplary circumferential positioning means, a wall portion 57b in contact with the side on the opposite side of the second insulator 50b in the circumferential direction of the first end portion 71ca of the W-phase winding 70c. With the third insulator 50c provided with the wall portion 57b, the position on the opposite side of the second insulator 50b in the circumferential direction of the first end portion 71ca of the W-phase winding 70c is determined, and hence the drawn position in the circumferential direction of the first end portion 71ca of the W-phase winding 70c is more easily determined.

In one aspect of the disclosure, as illustrated in FIG. 14, the second insulator 50b is provided with the wall portion 57a and the third insulator 50c is provided with the wall portion 57b. With this, the drawn positions in the circumferential direction of the second end portion 71bb of the V-phase winding 70b and the first end portion 71ca of the W-phase winding 70c adjacent to each other in the circumferential direction are more easily determined. This allows an easier connection between the second end portion 71bb of the V-phase winding 70b and the third busbar 20ca and an easier connection between the first end portion 71ca of the W-phase winding 70c and the third busbar 20ca, which are described later.

In the above, the circumferential positioning means for the second end portion 71bb of the V-phase winding 70b and the circumferential positioning means for the first end portion 71ca of the W-phase winding 70c are described as representatives with reference to the drawing. Similarly, circumferential positioning means for performing positioning in the circumferential direction of the end portion of the winding other than the second end portion 71bb of the V-phase winding 70b and the first end portion 71ca of the W-phase winding 70c is preferably provided as exemplified below.

The third insulator 50c is preferably provided with, as exemplary circumferential positioning means, a wall portion in contact with the side on the opposite side of the first insulator 50a in the circumferential direction of the second end portion 71cb of the W-phase winding 70c. With this, the position on the opposite side of the first insulator 50a in the circumferential direction of the second end portion 71cb of the W-phase winding 70c is determined, and hence the drawn position in the circumferential direction of the second end portion 71cb of the W-phase winding 70c is more easily determined.

The first insulator 50a is preferably provided with, as exemplary circumferential positioning means, a wall portion in contact with the side on the opposite side of the third insulator 50c in the circumferential direction of the first end portion 71aa of the U-phase winding 70a. With this, the position on the opposite side of the third insulator 50c in the circumferential direction of the first end portion 71aa of the U-phase winding 70a is determined, and hence the drawn position in the circumferential direction of the first end portion 71aa of the U-phase winding 70a is more easily determined.

In one aspect of the disclosure the third insulator 50c is provided with the wall portion in contact with the side on the opposite side of the first insulator 50a in the circumferential direction of the second end portion 71cb of the W-phase winding 70c, and that the first insulator 50a is provided with the wall portion in contact with the side on the opposite side of the third insulator 50c in the circumferential direction of the first end portion 71aa of the U-phase winding 70a. With this, the drawn positions in the circumferential direction of the second end portion 71cb of the W-phase winding 70c and the first end portion 71aa of the U-phase winding 70a adjacent to each other in the circumferential direction are more easily determined. This allows an easier connection between the second end portion 71cb of the W-phase winding 70c and the first busbar 20aa and an easier connection between the first end portion 71aa of the U-phase winding 70a and the first busbar 20aa, which are described later.

The first insulator 50a is preferably provided with, as exemplary circumferential positioning means, a wall portion in contact with the side on the opposite side of the second insulator 50b in the circumferential direction of the second end portion 71ab of the U-phase winding 70a. With this, the position on the opposite side of the second insulator 50b in the circumferential direction of the second end portion 71ab of the U-phase winding 70a is determined, and hence the drawn position in the circumferential direction of the second end portion 71ab of the U-phase winding 70a is more easily determined.

The second insulator 50b is preferably provided with, as exemplary circumferential positioning means, a wall portion in contact with the side on the opposite side of the first insulator 50a in the circumferential direction of the first end portion 71ba of the V-phase winding 70b. With this, the position on the opposite side of the first insulator 50a in the circumferential direction of the first end portion 71ba of the V-phase winding 70b is determined, and hence the drawn position in the circumferential direction of the first end portion 71ba of the V-phase winding 70b is more easily determined.

In one aspect of the disclosure the first insulator 50a is provided with the wall portion in contact with the side on the opposite side of the second insulator 50b in the circumferential direction of the second end portion 71ab of the U-phase winding 70a, and that the second insulator 50b is provided with the wall portion in contact with the side on the opposite side of the first insulator 50a in the circumferential direction of the first end portion 71ba of the V-phase winding 70b. With this, the drawn positions in the circumferential direction of the second end portion 71ab of the U-phase winding 70a and the first end portion 71ba of the V-phase winding 70b adjacent to each other in the circumferential direction are more easily determined. This allows an easier connection between the second end portion 71ab of the U-phase winding 70a and the second busbar 20ba and an easier connection between the first end portion 71ba of the V-phase winding 70b and the second busbar 20ba, which are described later.

The second insulator 50b is preferably provided with axial positioning means for performing positioning in the axial direction of the second end portion 71bb of the V-phase winding 70b. As illustrated in FIG. 14, the second insulator 50b is provided with, as exemplary axial positioning means, a ceiling portion 58a in contact with the upper side in the axial direction of the second end portion 71bb of the V-phase winding 70b, specifically, the side on the opposite side of the second groove 55b in the axial direction of the second end portion 71bb of the V-phase winding 70b herein. Further, as illustrated in FIG. 14, the second insulator 50b is provided with, as exemplary axial positioning means, a floor portion 59a in contact with the lower side in the axial direction of the second end portion 71bb of the V-phase winding 70b, specifically, the side on the second groove 55b side in the axial direction of the second end portion 71bb of the V-phase winding 70b herein. With the second insulator 50b provided with the ceiling portion 58a and the floor portion 59a, the position in the axial direction of the second end portion 71bb of the V-phase winding 70b is determined, and hence the drawn position in the axial direction of the second end portion 71bb of the V-phase winding 70b is more easily determined. Note that the second insulator 50b is preferably provided with, as axial positioning means for the second end portion 71bb of the V-phase winding 70b, the ceiling portion 58a and the floor portion 59a but may be provided only with one of the ceiling portion 58a and the floor portion 59a.

The third insulator 50c is preferably provided with axial positioning means for performing positioning in the axial direction of the first end portion 71ca of the W-phase winding 70c. As illustrated in FIG. 14, the third insulator 50c is provided with, as exemplary axial positioning means, a ceiling portion 58b in contact with the upper side in the axial direction of the first end portion 71ca of the W-phase winding 70c, specifically, the side on the opposite side of the second groove 55b in the axial direction of the first end portion 71ca of the W-phase winding 70c herein. Further, as illustrated in FIG. 14, the third insulator 50c is provided with, as exemplary axial positioning means, a floor portion 59b in contact with the lower side in the axial direction of the first end portion 71ca of the W-phase winding 70c, specifically, the side on the second groove 55b side in the axial direction of the first end portion 71ca of the W-phase winding 70c herein. With the third insulator 50c provided with the ceiling portion 58b and the floor portion 59b, the position in the axial direction of the first end portion 71ca of the W-phase winding 70c is determined, and hence the drawn position in the axial direction of the first end portion 71ca of the W-phase winding 70c is more easily determined. Note that the third insulator 50c is preferably provided with, as axial positioning means for the first end portion 71ca of the W-phase winding 70c, the ceiling portion 58b and the floor portion 59b but may be provided only with one of the ceiling portion 58b and the floor portion 59b.

In one aspect of the disclosure, as illustrated in FIG. 14, the second insulator 50b is provided with the ceiling portion 58a and the floor portion 59a and the third insulator 50c is provided with the ceiling portion 58b and the floor portion 59b. With this, the drawn positions in the axial direction of the second end portion 71bb of the V-phase winding 70b and the first end portion 71ca of the W-phase winding 70c adjacent to each other in the circumferential direction are more easily determined. This allows an easier connection between the second end portion 71bb of the V-phase winding 70b and the third busbar 20ca and an easier connection between the first end portion 71ca of the W-phase winding 70c and the third busbar 20ca, which are described later.

In the above, the axial positioning means for the second end portion 71bb of the V-phase winding 70b and the axial positioning means for the first end portion 71ca of the W-phase winding 70c are described as representatives with reference to the drawing. Similarly, axial positioning means for performing positioning in the axial direction of the end portion of the winding other than the second end portion 71bb of the V-phase winding 70b and the first end portion 71ca of the W-phase winding 70c is preferably provided as exemplified below.

The third insulator 50c is preferably provided with, as exemplary axial positioning means, a ceiling portion in contact with the upper side in the axial direction of the second end portion 71cb of the W-phase winding 70c, specifically, the side on the second groove 55b side in the axial direction of the second end portion 71cb of the W-phase winding 70c herein. Further, the third insulator 50c is preferably provided with, as exemplary axial positioning means, a floor portion in contact with the lower side in the axial direction of the second end portion 71cb of the W-phase winding 70c, specifically, the side on the opposite side of the second groove 55b in the axial direction of the second end portion 71cb of the W-phase winding 70c herein. With the third insulator 50c provided with such ceiling portion and floor portion, the position in the axial direction of the second end portion 71cb of the W-phase winding 70c is determined, and hence the drawn position in the axial direction of the second end portion 71cb of the W-phase winding 70c is more easily determined. Note that the third insulator 50c is preferably provided with, as axial positioning means for the second end portion 71cb of the W-phase winding 70c, the ceiling portion and the floor portion but may be provided only with one of the ceiling portion and the floor portion.

The first insulator 50a is preferably provided with, as exemplary axial positioning means, a ceiling portion in contact with the upper side in the axial direction of the first end portion 71aa of the U-phase winding 70a, specifically, the side on the second groove 55b side in the axial direction of the first end portion 71aa of the U-phase winding 70a herein. Further, the first insulator 50a is preferably provided with, as exemplary axial positioning means, a floor portion in contact with the lower side in the axial direction of the first end portion 71aa of the U-phase winding 70a, specifically, the side on the opposite side of the second groove 55b in the axial direction of the first end portion 71aa of the U-phase winding 70a herein. With the first insulator 50a provided with such ceiling portion and floor portion, the position in the axial direction of the first end portion 71aa of the U-phase winding 70a is determined, and hence the drawn position in the axial direction of the first end portion 71aa of the U-phase winding 70a is more easily determined. Note that the first insulator 50a is preferably provided with, as axial positioning means for the first end portion 71aa of the U-phase winding 70a, the ceiling portion and the floor portion but may be provided only with one of the ceiling portion and the floor portion.

In one aspect of the disclosure the third insulator 50c is provided with the ceiling portion in contact with the upper side in the axial direction of the second end portion 71cb of the W-phase winding 70c and the floor portion in contact with the lower side in the axial direction of the second end portion 71cb of the W-phase winding 70c, and that the first insulator 50a is provided with the ceiling portion in contact with the upper side in the axial direction of the first end portion 71aa of the U-phase winding 70a and the floor portion in contact with the lower side in the axial direction of the first end portion 71aa of the U-phase winding 70a. With this, the drawn positions in the axial direction of the second end portion 71cb of the W-phase winding 70c and the first end portion 71aa of the U-phase winding 70a adjacent to each other in the circumferential direction are more easily determined. This allows an easier connection between the second end portion 71cb of the W-phase winding 70c and the first busbar 20aa and an easier connection between the first end portion 71aa of the U-phase winding 70a and the first busbar 20aa, which are described later.

The first insulator 50a is preferably provided with, as exemplary axial positioning means, a ceiling portion in contact with the upper side in the axial direction of the second end portion 71ab of the U-phase winding 70a, specifically, the side on the third groove 55c side in the axial direction of the second end portion 71ab of the U-phase winding 70a herein. Further, the first insulator 50a is preferably provided with, as exemplary axial positioning means, a floor portion in contact with the lower side in the axial direction of the second end portion 71ab of the U-phase winding 70a, specifically, the side on the first groove 55a side in the axial direction of the second end portion 71ab of the U-phase winding 70a herein. With the first insulator 50a provided with such ceiling portion and floor portion, the position in the axial direction of the second end portion 71ab of the U-phase winding 70a is determined, and hence the drawn position in the axial direction of the second end portion 71ab of the U-phase winding 70a is more easily determined. Note that the first insulator 50a is preferably provided with, as axial positioning means for the second end portion 71ab of the U-phase winding 70a, the ceiling portion and the floor portion but may be provided only with one of the ceiling portion and the floor portion.

The second insulator 50b is preferably provided with, as exemplary axial positioning means, a ceiling portion in contact with the upper side in the axial direction of the first end portion 71ba of the V-phase winding 70b, specifically, the side on the third groove 55c side in the axial direction of the first end portion 71ba of the V-phase winding 70b herein. Further, the second insulator 50b is preferably provided with, as exemplary axial positioning means, a floor portion in contact with the lower side in the axial direction of the first end portion 71ba of the V-phase winding 70b, specifically, the side on the first groove 55a side in the axial direction of the first end portion 71ba of the V-phase winding 70b herein. With the second insulator 50b provided with such ceiling portion and floor portion, the position in the axial direction of the first end portion 71ba of the V-phase winding 70b is determined, and hence the drawn position in the axial direction of the first end portion 71ba of the V-phase winding 70b is more easily determined. Note that the second insulator 50b is preferably provided with, as axial positioning means for the first end portion 71ba of the V-phase winding 70b, the ceiling portion and the floor portion but may be provided only with one of the ceiling portion and the floor portion.

In one aspect of the disclosure the first insulator 50a is provided with the ceiling portion in contact with the upper side in the axial direction of the second end portion 71ab of the U-phase winding 70a and the floor portion in contact with the lower side in the axial direction of the second end portion 71ab of the U-phase winding 70a, and that the second insulator 50b is provided with the ceiling portion in contact with the upper side in the axial direction of the first end portion 71ba of the V-phase winding 70b and the floor portion in contact with the lower side in the axial direction of the first end portion 71ba of the V-phase winding 70b. With this, the drawn positions in the axial direction of the second end portion 71ab of the U-phase winding 70a and the first end portion 71ba of the V-phase winding 70b adjacent to each other in the circumferential direction are more easily determined. This allows an easier connection between the second end portion 71ab of the U-phase winding 70a and the second busbar 20ba and an easier connection between the first end portion 71ba of the V-phase winding 70b and the second busbar 20ba, which are described later.

Figure 15:
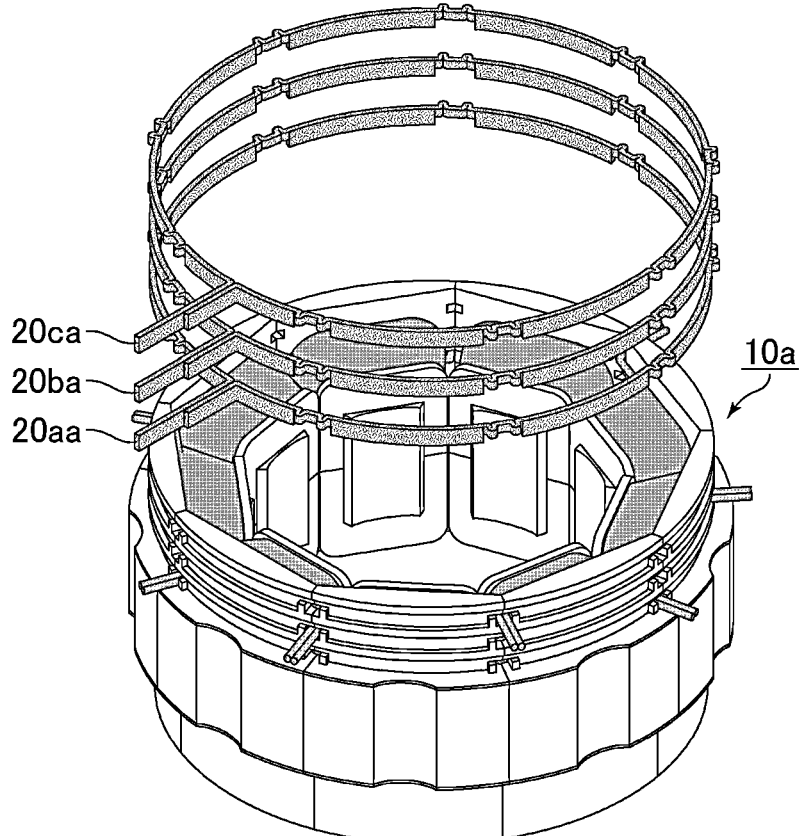
FIG. 15 is a schematic perspective view illustrating the state before a first busbar, a second busbar, and a third busbar are provided on the outer peripheral surface of the coil unit assembly illustrated in FIG. 13.
Figure 16:
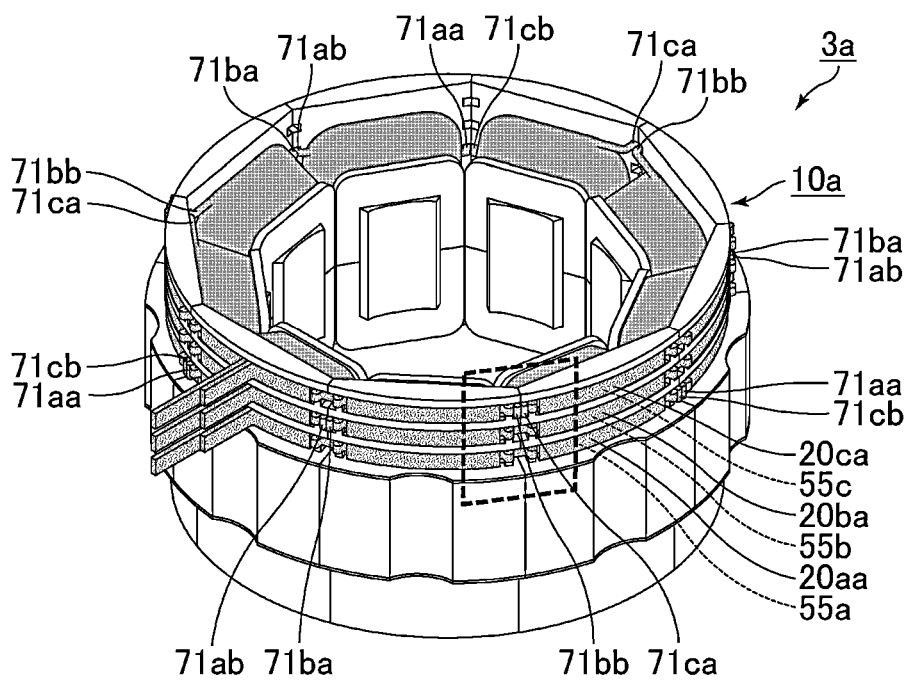
FIG. 16 is a schematic perspective view illustrating a stator according to in accordance with aspects of the present disclosure in which the first busbar, the second busbar, and the third busbar have been provided on the outer peripheral surface of the coil unit assembly illustrated in FIG. 13.

FIG. 15 is a schematic perspective view illustrating the state before the first busbar, the second busbar, and the third busbar are provided on the outer peripheral surface of the coil unit assembly illustrated in FIG. 13. FIG. 16 is a schematic perspective view illustrating a stator according to an aspect of the present disclosure in which the first busbar, the second busbar, and the third busbar have been provided on the outer peripheral surface of the coil unit assembly illustrated in FIG. 13.

With the first busbar 20aa, the second busbar 20ba, and the third busbar 20ca provided on the outer peripheral surface of the coil unit assembly 10a as illustrated in FIG. 15, the stator 3a as illustrated in FIG. 16 is formed.

As illustrated in FIG. 16, the first busbar 20aa is provided in the first groove 55a. Further, the second busbar 20ba is provided in the second groove 55b. Moreover, the third busbar 20ca is provided in the third groove 55c. With the first busbar 20aa, the second busbar 20ba, and the third busbar 20ca provided in this way, the first busbar 20aa, the second busbar 20ba, and the third busbar 20ca fit inside the length range in the axial direction of the coil unit assembly 10a so that the stator 3a can be thinned in the axial direction. Moreover, the motor 1 including the stator 3a can thus be thinned in the axial direction.

As illustrated in FIG. 16, in the radial direction, the outer end, located on the opposite side of the inner peripheral surface of the coil unit assembly 10a, of the first busbar 20aa is preferably located closer to the inner peripheral surface of the coil unit assembly 10a than the outer end of the outer peripheral surface of the coil unit assembly is 10a. With the first busbar 20aa provided in this way, the first busbar 20aa fits inside the length range in the radial direction of the coil unit assembly 10a so that the stator 3a can be miniaturized in the radial direction. Moreover, the motor 1 including the stator 3a can thus be miniaturized in the radial direction. Note that, in the radial direction, the outer end of the outer peripheral surface of the coil unit assembly 10a may be located closer to the inner peripheral surface of the coil unit assembly 10a than the outer end, located on the opposite side of the inner peripheral surface of the coil unit assembly 10a, of the first busbar 20aa is.

As illustrated in FIG. 16, in the radial direction, the outer end, located on the opposite side of the inner peripheral surface of the coil unit assembly 10a, of the second busbar 20ba is preferably located closer to the inner peripheral surface of the coil unit assembly 10a than the outer end of the outer peripheral surface of the coil unit assembly 10a is. With the second busbar 20ba provided in this way, the second busbar 20ba fits inside the length range in the radial direction of the coil unit assembly 10a so that the stator 3a can be miniaturized in the radial direction. Moreover, the motor 1 including the stator 3a can thus be miniaturized in the radial direction. Note that, in the radial direction, the outer end of the outer peripheral surface of the coil unit assembly 10a may be located closer to the inner peripheral surface of the coil unit assembly 10a than the outer end, located on the opposite side of the inner peripheral surface of the coil unit assembly 10a, of the second busbar 20ba is.

As illustrated in FIG. 16, in the radial direction, the outer end, located on the opposite side of the inner peripheral surface of the coil unit assembly 10a, of the third busbar 20ca is preferably located closer to the inner peripheral surface of the coil unit assembly 10a than the outer end of the outer peripheral surface of the coil unit assembly 10a is. With the third busbar 20ca provided in this way, the third busbar 20ca fits inside the length range in the radial direction of the coil unit assembly 10a so that the stator 3a can be miniaturized in the radial direction. Moreover, the motor 1 including the stator 3a can thus be miniaturized in the radial direction. Note that, in the radial direction, the outer end of the outer peripheral surface of the coil unit assembly 10a may be located closer to the inner peripheral surface of the coil unit assembly 10a than the outer end, located on the opposite side of the inner peripheral surface of the coil unit assembly 10a, of the third busbar 20ca is.

In one aspect of the disclosure, as illustrated in FIG. 16, in the radial direction, the respective outer ends, located on the opposite side of the inner peripheral surface of the coil unit assembly 10a, of the first busbar 20aa, the second busbar 20ba, and the third busbar 20ca are located closer to the inner peripheral surface of the coil unit assembly 10a than the outer end of the outer peripheral surface of the coil unit assembly 10a is. With the first busbar 20aa, the second busbar 20ba, and the third busbar 20ca provided in this way, the first busbar 20aa, the second busbar 20ba, and the third busbar 20ca fit inside the length range in the radial direction of the coil unit assembly 10a so that the stator 3a can be sufficiently miniaturized in the radial direction. Moreover, the motor 1 including the stator 3a can thus be sufficiently miniaturized in the radial direction.

Figure 17:
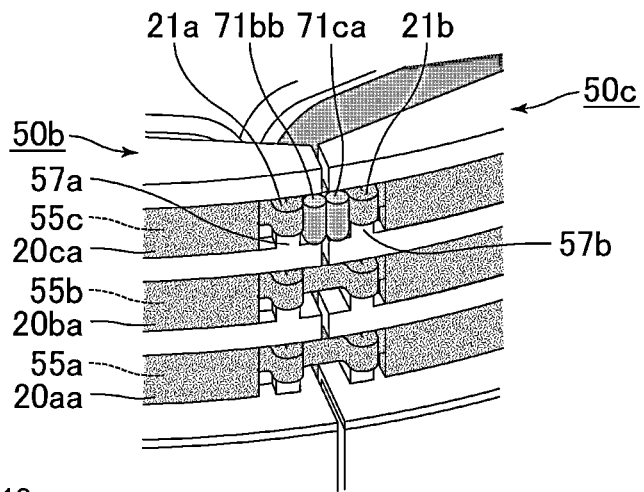
FIG. 17 is a schematic perspective view illustrating the region surrounded by the dotted line in FIG. 16 in an enlarged manner.

FIG. 17 is a schematic perspective view illustrating the region surrounded by the dotted line in FIG. 16 in an enlarged manner.

As illustrated in FIG. 17, the third busbar 20ca has a bent portion 21a and a bent portion 21b that are a pair of bent portions adjacent to each other in the circumferential direction. The bent portion 21a is located on the surface on the opposite side of the second groove 55b in the axial direction of the wall portion 57a provided to the second insulator 50b. The bent portion 21b is located on the surface on the opposite side of the second groove 55b in the axial direction of the wall portion 57b provided to the third insulator 50c. In the third busbar 20ca, the lengths in the axial direction of the bent portion 21a and the bent portion 21b are smaller than the lengths in the axial direction of the other portions.

The second end portion 71bb of the V-phase winding 70b and the first end portion 71ca of the W-phase winding 70c adjacent to each other in the circumferential direction are sandwiched by the bent portion 21a and the bent portion 21b in the circumferential direction. More specifically, the second end portion 71bb of the V-phase winding 70b and the first end portion 71ca of the W-phase winding 70c bent upward in the axial direction are sandwiched by the bent portion 21a and the bent portion 21b in the circumferential direction.

With the second end portion 71bb of the V-phase winding 70b and the first end portion 71ca of the W-phase winding 70c sandwiched by the bent portion 21a and the bent portion 21b in the circumferential direction, the second end portion 71bb of the V-phase winding 70b and the first end portion 71ca of the W-phase winding 70c are in contact with each other and electrically connected to each other by the third busbar 20ca. That is, the second end portion 71bb of the V-phase winding 70b and the third busbar 20ca are connected to each other. The second end portion 71bb of the V-phase winding 70b and the third busbar 20ca may be connected to each other directly or by soldering or welding, for example. Further, the first end portion 71ca of the W-phase winding 70c and the third busbar 20ca are connected to each other. The first end portion 71ca of the W-phase winding 70c and the third busbar 20ca may be connected to each other directly or by soldering or welding, for example.

With the second end portion 71bb of the V-phase winding 70b and the first end portion 71ca of the W-phase winding 70c sandwiched by the bent portion 21a and the bent portion 21b in the circumferential direction, the second end portion 71bb of the V-phase winding 70b and the first end portion 71ca of the W-phase winding 70c are fixed between the bent portion 21a and the bent portion 21b. This allows an easier connection between the second end portion 71bb of the V-phase winding 70b and the first end portion 71ca of the W-phase winding 70c by soldering or welding, for example, an easier connection between the second end portion 71bb of the V-phase winding 70b and the third busbar 20ca by soldering or welding, for example, and an easier connection between the first end portion 71ca of the W-phase winding 70c and the third busbar 20ca by soldering or welding, for example. Further, the second end portion 71bb of the V-phase winding 70b and the first end portion 71ca of the W-phase winding 70c are prevented from coming off due to external vibration, impact, or the like.

In the above, the fixing mode between the second end portion 71bb of the V-phase winding 70b and the first end portion 71ca of the W-phase winding 70c by the third busbar 20ca is described as a representative with reference to the drawing. Similarly, of the combinations of the end portions of the two windings adjacent to each other in the circumferential direction, the combination other than the combination of the second end portion 71bb of the V-phase winding 70b and the first end portion 71ca of the W-phase winding 70c is also sandwiched by the pair of bent portions of the busbar in the circumferential direction as described below.

The second end portion 71cb of the W-phase winding 70c and the first end portion 71aa of the U-phase winding 70a adjacent to each other in the circumferential direction are sandwiched by the pair of bent portions of the first busbar 20aa in the circumferential direction. More specifically, the second end portion 71cb of the W-phase winding 70c and the first end portion 71aa of the U-phase winding 70a bent upward in the axial direction are sandwiched by the pair of bent portions of the first busbar 20aa in the circumferential direction.

With the second end portion 71cb of the W-phase winding 70c and the first end portion 71aa of the U-phase winding 70a sandwiched by the pair of bent portions in the circumferential direction, the second end portion 71cb of the W-phase winding 70c and the first end portion 71aa of the U-phase winding 70a are in contact with each other and electrically connected to each other by the first busbar 20aa. That is, the second end portion 71cb of the W-phase winding 70c and the first busbar 20aa are connected to each other. The second end portion 71cb of the W-phase winding 70c and the first busbar 20aa may be connected to each other directly or by soldering or welding, for example. Further, the first end portion 71aa of the U-phase winding 70a and the first busbar 20aa are connected to each other. The first end portion 71aa of the U-phase winding 70a and the first busbar 20aa may be connected to each other directly or by soldering or welding, for example.

With the second end portion 71cb of the W-phase winding 70c and the first end portion 71aa of the U-phase winding 70a sandwiched by the pair of bent portions in the circumferential direction, the second end portion 71cb of the W-phase winding 70c and the first end portion 71aa of the U-phase winding 70a are fixed between the pair of bent portions. This allows an easier connection between the second end portion 71cb of the W-phase winding 70c and the first end portion 71aa of the U-phase winding 70a by soldering or welding, for example, an easier connection between the second end portion 71cb of the W-phase winding 70c and the first busbar 20aa by soldering or welding, for example, and an easier connection between the first end portion 71aa of the U-phase winding 70a and the first busbar 20aa by soldering or welding, for example. Further, the second end portion 71cb of the W-phase winding 70c and the first end portion 71aa of the U-phase winding 70a are prevented from coming off due to external vibration, impact, or the like.

The second end portion 71*ab* of the U-phase winding 70*a* and the first end portion 71*ba* of the V-phase winding 70*b* adjacent to each other in the circumferential direction are sandwiched by the pair of bent portions of the second busbar 20*ba* in the circumferential direction. More specifically, the second end portion 71*ab* of the U-phase winding 70*a* and the first end portion 71*ba* of the V-phase winding 70*b* bent upward in the axial direction are sandwiched by the pair of bent portions of the second busbar 20*ba* in the circumferential direction.

With the second end portion 71*ab* of the U-phase winding 70*a* and the first end portion 71*ba* of the V-phase winding 70*b* sandwiched by the pair of bent portions in the circumferential direction, the second end portion 71*ab* of the U-phase winding 70*a* and the first end portion 71*ba* of the V-phase winding 70*b* are in contact with each other and electrically connected to each other by the second busbar 20*ba*. That is, the second end portion 71*ab* of the U-phase winding 70*a* and the second busbar 20*ba* are connected to each other. The second end portion 71*ab* of the U-phase winding 70*a* and the second busbar 20*ba* may be connected to each other directly or by soldering or welding, for example. Further, the first end portion 71*ba* of the V-phase winding 70*b* and the second busbar 20*ba* are connected to each other. The first end portion 71*ba* of the V-phase winding 70*b* and the second busbar 20*ba* may be connected to each other directly or by soldering or welding, for example.

With the second end portion 71*ab* of the U-phase winding 70*a* and the first end portion 71*ba* of the V-phase winding 70*b* sandwiched by the pair of bent portions in the circumferential direction, the second end portion 71*ab* of the U-phase winding 70*a* and the first end portion 71*ba* of the V-phase winding 70*b* are fixed between the pair of bent portions. This allows an easier connection between the second end portion 71*ab* of the U-phase winding 70*a* and the first end portion 71*ba* of the V-phase winding 70*b* by soldering or welding, for example, an easier connection between the second end portion 71*ab* of the U-phase winding 70*a* and the second busbar 20*ba* by soldering or welding, for example, and an easier connection between the first end portion 71*ba* of the V-phase winding 70*b* and the second busbar 20*ba* by soldering or welding, for example. Further, the second end portion 71*ab* of the U-phase winding 70*a* and the first end portion 71*ba* of the V-phase winding 70*b* are prevented from coming off due to external vibration, impact, or the like.

As described above, the U-phase winding 70*a*, the V-phase winding 70*b*, and the W-phase winding 70*c* are electrically connected to each other by the first busbar 20*aa*, the second busbar 20*ba*, and the third busbar 20*ca*, to thereby form a delta connection with parallel circuits in the respective phases. The first busbar 20*aa*, the second busbar 20*ba*, and the third busbar 20*ca* are connected to a drive circuit, which is not illustrated, and drive currents in the three phases, namely, a U-phase drive current, a V-phase drive current, and a W-phase drive current are supplied from the drive circuit to the U-phase winding 70*a*, the V-phase winding 70*b*, and the W-phase winding 70*c*, respectively, through the first busbar 20*aa*, the second busbar 20*ba*, and the third busbar 20*ca*.

In one aspect of the disclosure, as described above, of the combination of the second end portion 71*bb* of the V-phase winding 70*b* and the first end portion 71*ca* of the W-phase winding 70*c*, the combination of the second end portion 71*cb* of the W-phase winding 70*c* and the first end portion 71*aa* of the U-phase winding 70*a*, and the combination of the second end portion 71*ab* of the U-phase winding 70*a* and the first end portion 71*ba* of the V-phase winding 70*b*, the end portions of the two windings in all the combinations are sandwiched by the pair of bent portions of the busbar in the circumferential direction, but the end portions of the two windings in some of the combinations may be sandwiched by the pair of bent portions of the busbar in the circumferential direction.

The first busbar 20*aa* is preferably annular when viewed from the axial direction. With this, with regard to the flow of a U-phase drive current through the first busbar 20*aa*, the flow direction of the drive current is not limited to a single direction, for example, clockwise, with the result that the current density tends to drop.

The second busbar 20*ba* is preferably annular when viewed from the axial direction. With this, with regard to the flow of a V-phase drive current through the second busbar 20*ba*, the flow direction of the drive current is not limited to a single direction, for example, clockwise, with the result that the current density tends to drop.

The third busbar 20*ca* is preferably annular when viewed from the axial direction. With this, with regard to the flow of a W-phase drive current through the third busbar 20*ca*, the flow direction of the drive current is not limited to a single direction, for example, clockwise, with the result that the current density tends to drop.

When viewed from the axial direction, the first busbar 20*aa*, the second busbar 20*ba*, and the third busbar 20*ca* may each have a substantially circular ring shape or a substantially polygonal ring shape.

In one aspect of the disclosure, when viewed from the axial direction, the first busbar 20*aa*, the second busbar 20*ba*, and the third busbar 20*ca* each are annular. Note that when viewed from the axial direction, some busbars of the first busbar 20*aa*, the second busbar 20*ba*, and the third busbar 20*ca* may be annular. Further, when viewed from the axial direction, at least one of the first busbar 20*aa*, the second busbar 20*ba*, and the third busbar 20*ca* may have a shape with an annular hole.

As illustrated in FIG. 15, the first busbar 20*aa* is preferably formed into an annular shape with which both the ends of a single conductor are brought into contact. In this case, for example, the first busbar 20*aa* can be produced by punching out a single conductor from a conductor sheet and bending the conductor, and the rest of the conductor sheet can be utilized in producing other busbars. Thus, a portion of the conductor sheet to be discarded is minimum, resulting in a reduction in manufacturing cost.

In contrast to this, when an annular conductor is punched out from a conductor sheet to produce an annular busbar, the rest of the conductor sheet cannot be utilized in producing an annular busbar of the same size. Thus, a portion of the conductor sheet to be discarded is large, resulting in an increase in manufacturing cost.

From a similar viewpoint, as illustrated in FIG. 15, the second busbar 20*ba* is preferably formed into an annular shape with which both the ends of a single conductor are brought into contact. Further, as illustrated in FIG. 15, the third busbar 20*ca* is preferably formed into an annular shape with which both the ends of a single conductor are brought into contact.

In one aspect of the disclosure, as illustrated in FIG. 15, the first busbar 20*aa*, the second busbar 20*ba*, and the third busbar 20*ca* each are formed into an annular shape with which both the ends of a single conductor are brought into contact. Note that some busbars of the first busbar 20*aa*, the second busbar 20*ba*, and the third busbar 20*ca* may each be formed into an annular shape with which both the ends of a single conductor are brought into contact.

The first busbar 20*aa* may contain copper. With this, the first busbar 20*aa* is low in resistance, and hence a U-phase drive current flows through the first busbar 20*aa* more easily.

The second busbar 20*ba* may contain copper. With this, the second busbar 20*ba* is low in resistance, and hence a V-phase drive current flows through the second busbar 20*ba* more easily.

The third busbar 20*ca* may contain copper. With this, the third busbar 20*ca* is low in resistance, and hence a W-phase drive current flows through the third busbar 20*ca* more easily.

From the viewpoint of allowing drive currents in the three phases of the U phase, the V phase, and the W phase to flow more easily, thus the first busbar 20*aa*, the second busbar 20*ba*, and the third busbar 20*ca* may each contain copper. Note that some busbars of the first busbar 20*aa*, the second busbar 20*ba*, and the third busbar 20*ca* may contain copper.

The first busbar 20*aa* may include a conductive spring material. With this, the first busbar 20*aa* is more easily mounted on the coil unit assembly 10*a*.

The second busbar 20*ba* may include a conductive spring material. With this, the second busbar 20*ba* is more easily mounted on the coil unit assembly 10*a*.

The third busbar 20*ca* may include a conductive spring material. With this, the third busbar 20*ca* is more easily mounted on the coil unit assembly 10*a*.

From the viewpoint of facilitating mounting on the coil unit assembly 10*a*, the first busbar 20*aa*, the second busbar 20*ba*, and the third busbar 20*ca* may each include a conductive spring material. Note that some busbars of the first busbar 20*aa*, the second busbar 20*ba*, and the third busbar 20*ca* may include conductive spring materials.

Examples of the conductive spring materials include iron, stainless steel, aluminum, and alloys containing at least one of these metals.

In the stator of the present disclosure, an end portion of the winding may be connected to a terminal provided to the insulator and electrically connected to the busbar with the terminal interposed therebetween. An example of such a case is described below as a stator according to an aspect of the present disclosure. The stator according to an aspect of the present disclosure is similar to the stator according to an aspect of the present disclosure except that the end portion of the winding is connected to a terminal provided to the insulator.

Figure 18:
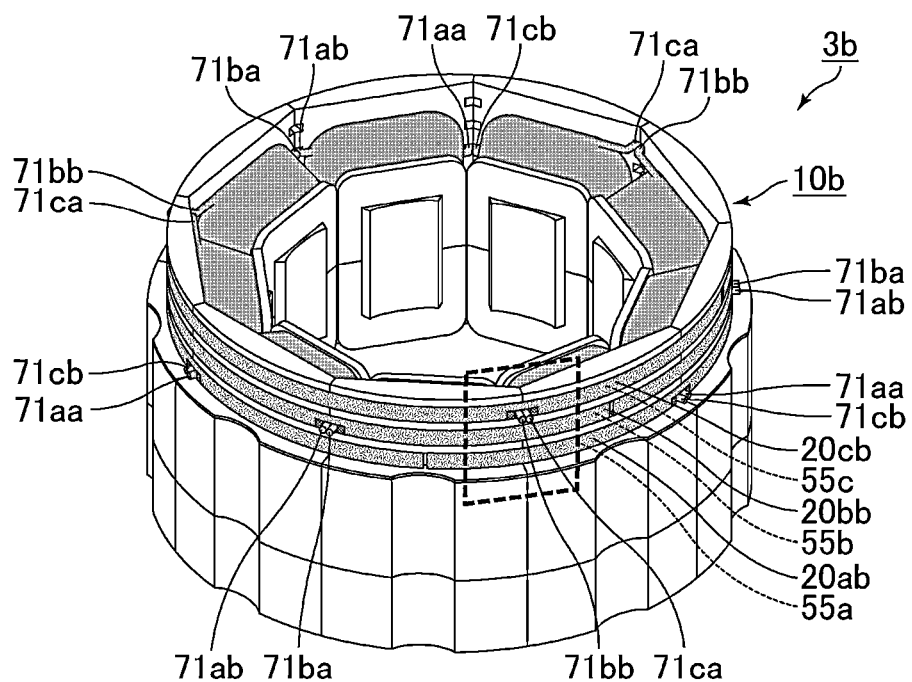
FIG. 18 is a schematic perspective view illustrating a stator in accordance with aspects of the present disclosure.

FIG. 18 is a schematic perspective view illustrating the stator according to an aspect of the present disclosure.

As illustrated in FIG. 18, a stator 3*b* includes a coil unit assembly 10*b*, a first busbar 20*ab*, a second busbar 20*bb*, and a third busbar 20*cb*.

The first busbar 20*ab* is provided in the first groove 55*a*. Further, the second busbar 20*bb* is provided in the second groove 55*b*. Moreover, the third busbar 20*cb* is provided in the third groove 55*c*.

As compared with the first busbar 20*aa*, the second busbar 20*ba*, and the third busbar 20*ca*, which are described with reference to FIG. 15 and the like, the first busbar 20*ab*, the second busbar 20*bb*, and the third busbar 20*cb* have a simple shape with no bent portion and are thus low in manufacturing cost.

Figure 19:
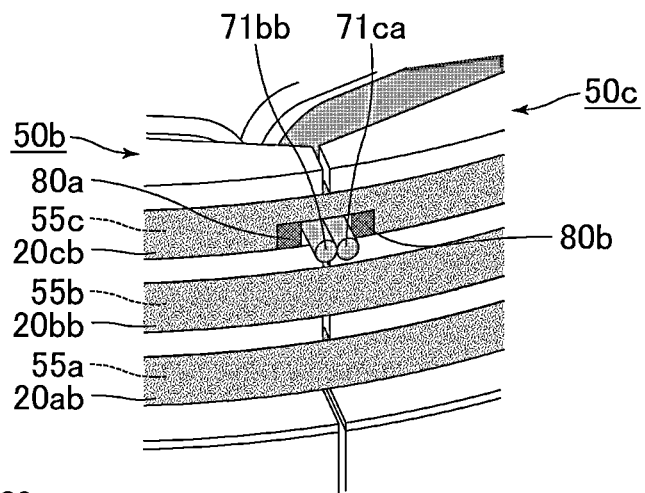
FIG. 19 is a schematic perspective view illustrating the region surrounded by the dotted line in FIG. 18 in an enlarged manner.

FIG. 19 is a schematic perspective view illustrating the region surrounded by the dotted line in FIG. 18 in an enlarged manner.

The second end portion 71*bb* of the V-phase winding 70*b* is connected to a terminal provided to the second insulator 50*b* and electrically connected to the third busbar 20*cb* with the terminal interposed therebetween. As illustrated in FIG. 19, the second insulator 50*b* is provided with, as an example of such a terminal, a terminal 80*a* in contact with the side on the opposite side of the third insulator 50*c* in the circumferential direction of the second end portion 71*bb* of the V-phase winding 70*b*. That is, the terminal 80*a* is provided at a location corresponding to the wall portion 57*a* illustrated in FIG. 14. The terminal 80*a* is provided to the second insulator 50*b* by adhesion or integral molding, for example.

The second end portion 71*bb* of the V-phase winding 70*b* is connected to the terminal 80*a*. The second end portion 71*bb* of the V-phase winding 70*b* and the terminal 80*a* may be connected to each other directly or by soldering or welding, for example.

The second end portion 71*bb* of the V-phase winding 70*b* is electrically connected to the third busbar 20*cb* with the terminal 80*a* interposed therebetween. That is, the third busbar 20*cb* and the terminal 80*a* are connected to each other. The third busbar 20*cb* and the terminal 80*a* may be connected to each other directly or by soldering or welding, for example. Note that the second end portion 71*bb* of the V-phase winding 70*b* and the third busbar 20*cb* may be in contact with each other but are not necessarily in contact with each other.

The first end portion 71*ca* of the W-phase winding 70*c* is connected to a terminal provided to the third insulator 50*c* and electrically connected to the third busbar 20*cb* with the terminal interposed therebetween. As illustrated in FIG. 19, the third insulator 50*c* is provided with, as an example of such a terminal, a terminal 80*b* in contact with the side on the opposite side of the second insulator 50*b* in the circumferential direction of the first end portion 71*ca* of the W-phase winding 70*c*. That is, the terminal 80*b* is provided at a location corresponding to the wall portion 57*b* illustrated in FIG. 14. The terminal 80*b* is provided to the third insulator 50*c* by adhesion or integral molding, for example.

The first end portion 71*ca* of the W-phase winding 70*c* is connected to the terminal 80*b*. The first end portion 71*ca* of the W-phase winding 70*c* and the terminal 80*b* may be connected to each other directly or by soldering or welding, for example.

The first end portion 71*ca* of the W-phase winding 70*c* is electrically connected to the third busbar 20*cb* with the terminal 80*b* interposed therebetween. That is, the third busbar 20*cb* and the terminal 80*b* are connected to each other. The third busbar 20*cb* and the terminal 80*b* may be connected to each other directly or by soldering or welding, for example. Note that the first end portion 71*ca* of the W-phase winding 70*c* and the third busbar 20*cb* may be in contact with each other but are not necessarily in contact with each other.

With the second end portion 71*bb* of the V-phase winding 70*b* connected to the terminal 80*a*, the second end portion 71*bb* of the V-phase winding 70*b* is fixed to the terminal 80*a*. Further, with the first end portion 71*ca* of the W-phase winding 70*c* connected to the terminal 80*b*, the first end portion 71*ca* of the W-phase winding 70*c* is fixed to the terminal 80*b*. From the above, the second coil unit 30*b* and the third coil unit 30*c* are more easily joined to each other.

In the above, the connection mode of the second end portion 71*bb* of the V-phase winding 70*b* and the connection mode of the first end portion 71*ca* of the W-phase winding 70*c* are described as representatives with reference to the drawing. Similarly, the end portion of the winding other than the second end portion 71*bb* of the V-phase winding 70*b* and the first end portion 71*ca* of the W-phase winding 70*c* is also connected to a terminal provided to the insulator and electrically connected to the busbar with the terminal interposed therebetween as described below.

The second end portion 71cb of the W-phase winding 70c is connected to a terminal provided to the third insulator 50c and electrically connected to the first busbar 20ab with the terminal interposed therebetween. The third insulator 50c is provided with, as an example of such a terminal, a terminal in contact with the side on the opposite side of the first insulator 50a in the circumferential direction of the second end portion 71cb of the W-phase winding 70c.

The first end portion 71aa of the U-phase winding 70a is connected to a terminal provided to the first insulator 50a and electrically connected to the first busbar 20ab with the terminal interposed therebetween. The first insulator 50a is provided with, as an example of such a terminal, a terminal in contact with the side on the opposite side of the third insulator 50c in the circumferential direction of the first end portion 71aa of the U-phase winding 70a.

With the second end portion 71cb of the W-phase winding 70c connected to the terminal, the second end portion 71cb of the W-phase winding 70c is fixed to the terminal. Further, with the first end portion 71aa of the U-phase winding 70a connected to the terminal, the first end portion 71aa of the U-phase winding 70a is fixed to the terminal. From the above, the third coil unit 30c and the first coil unit 30a are more easily joined to each other.

The second end portion 71ab of the U-phase winding 70a is connected to a terminal provided to the first insulator 50a and electrically connected to the second busbar 20bb with the terminal interposed therebetween. The first insulator 50a is provided with, as an example of such a terminal, a terminal in contact with the side on the opposite side of the second insulator 50b in the circumferential direction of the second end portion 71ab of the U-phase winding 70a.

The first end portion 71ba of the V-phase winding 70b is connected to a terminal provided to the second insulator 50b and electrically connected to the second busbar 20bb with the terminal interposed therebetween. The second insulator 50b is provided with, as an example of such a terminal, a terminal in contact with the side on the opposite side of the first insulator 50a in the circumferential direction of the first end portion 71ba of the V-phase winding 70b.

With the second end portion 71ab of the U-phase winding 70a connected to the terminal, the second end portion 71ab of the U-phase winding 70a is fixed to the terminal. Further, with the first end portion 71ba of the V-phase winding 70b connected to the terminal, the first end portion 71ba of the V-phase winding 70b is fixed to the terminal. From the above, the first coil unit 30a and the second coil unit 30b are more easily joined to each other.

In one aspect of the disclosure, as described above, of the second end portion 71bb of the V-phase winding 70b, the first end portion 71ca of the W-phase winding 70c, the second end portion 71cb of the W-phase winding 70c, the first end portion 71aa of the U-phase winding 70a, the second end portion 71ab of the U-phase winding 70a, and the first end portion 71ba of the V-phase winding 70b, the end portions of all the windings are connected to the terminals provided to the insulators and electrically connected to the busbars with the terminals interposed therebetween, but the end portions of some of the windings may be connected to the terminals provided to the insulators and electrically connected to the busbars with the terminals interposed therebetween.

A motor according to an aspect of the present disclosure is similar to the motor described above except for including the stator according to an aspect of the present disclosure.

The end portion of the winding, which is fixed between the pair of bent portions of the busbar in the stator described above and fixed to the terminal provided to the insulator in the stator described above, may be fixed by a method other than these. An example of such a case is described below as a stator according to an aspect of the present disclosure. The stator according to an aspect of the present disclosure is similar to the stator described above of the present disclosure except that the busbar is provided with no bent portion. Further, the stator according to an aspect of the present disclosure is similar to the stator described above of the present disclosure except that the insulator is provided with no terminal.

Figure 20:
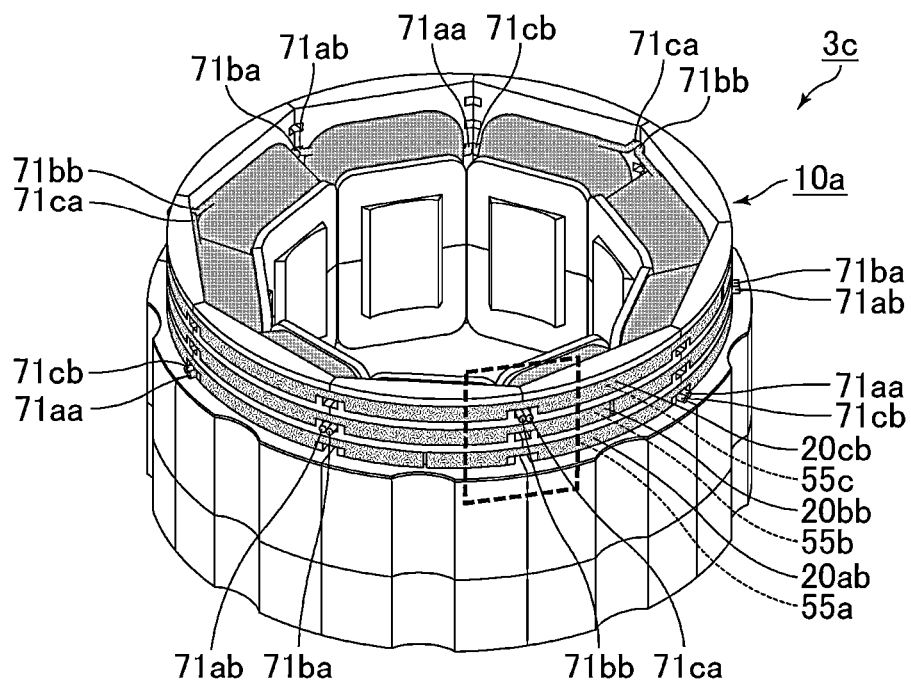
FIG. 20 is a schematic perspective view illustrating a stator in accordance with aspects of the present disclosure.

FIG. 20 is a schematic perspective view illustrating the stator according to an aspect of the present disclosure.

As illustrated in FIG. 20, a stator 3c includes the coil unit assembly 10a, the first busbar 20ab, the second busbar 20bb, and the third busbar 20cb.

Figure 21:
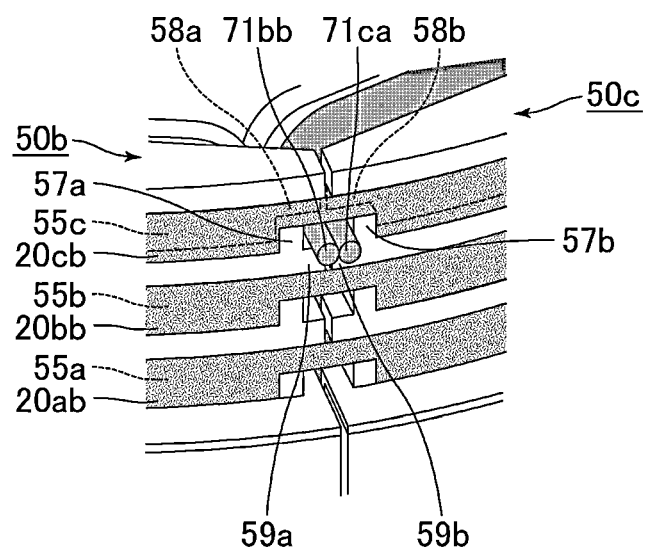
FIG. 21 is a schematic perspective view illustrating the region surrounded by the dotted line in FIG. 20 in an enlarged manner.

FIG. 21 is a schematic perspective view illustrating the region surrounded by the dotted line in FIG. 20 in an enlarged manner.

As illustrated in FIG. 21, the second end portion 71bb of the V-phase winding 70b and the first end portion 71ca of the W-phase winding 70c adjacent to each other in the circumferential direction are fixed in the space between the second insulator 50b and the third insulator 50c, more specifically, the space surrounded by the wall portion 57a, the ceiling portion 58a, the floor portion 59a, the wall portion 57b, the ceiling portion 58b, and the floor portion 59b. Such a fixing mode also allows an easier connection between the second end portion 71bb of the V-phase winding 70b and the first end portion 71ca of the W-phase winding 70c by soldering or welding, for example, an easier connection between the second end portion 71bb of the V-phase winding 70b and the third busbar 20cb by soldering or welding, for example, and an easier connection between the first end portion 71ca of the W-phase winding 70c and the third busbar 20cb by soldering or welding, for example.

In the above, the fixing mode between the second end portion 71bb of the V-phase winding 70b and the first end portion 71ca of the W-phase winding 70c is described as a representative with reference to the drawing. Similarly, of the combinations of the end portions of the two windings adjacent to each other in the circumferential direction, the combination other than the combination of the second end portion 71bb of the V-phase winding 70b and the first end portion 71ca of the W-phase winding 70c is also fixed in the space between the two insulators adjacent to each other in the circumferential direction as described below.

The second end portion 71cb of the W-phase winding 70c and the first end portion 71aa of the U-phase winding 70a adjacent to each other in the circumferential direction are fixed in the space between the third insulator 50c and the first insulator 50a. Such a fixing mode also allows an easier connection between the second end portion 71cb of the W-phase winding 70c and the first end portion 71aa of the U-phase winding 70a by soldering or welding, for example, an easier connection between the second end portion 71cb of the W-phase winding 70c and the first busbar 20ab by soldering or welding, for example, and an easier connection between the first end portion 71aa of the U-phase winding 70a and the first busbar 20ab by soldering or welding, for example.

The second end portion 71ab of the U-phase winding 70a and the first end portion 71ba of the V-phase winding 70b adjacent to each other in the circumferential direction are fixed in the space between the first insulator 50a and the second insulator 50b. Such a fixing mode also allows an easier connection between the second end portion 71ab of the U-phase winding 70a and the first end portion 71ba of the V-phase winding 70b by soldering or welding, for example, an easier connection between the second end portion 71ab of the U-phase winding 70a and the second busbar 20bb by soldering or welding, for example, and an easier connection between the first end portion 71ba of the V-phase winding 70b and the second busbar 20bb by soldering or welding, for example.

Further, as compared with the stator 3b, the stator 3c includes the insulator provided with no terminal and is thus small in number of components, resulting in low manufacturing cost.

A motor according to an aspect of the present disclosure is similar to the motor described above of the present disclosure except for including the stator according to an aspect of the present disclosure. Further, the motor according to an aspect of the present disclosure is similar to the motor described above of the present disclosure except for including the stator according to an aspect of the present disclosure.

In general, the description of the aspects disclosed should be considered as being illustrative in all respects and not being restrictive. The scope of the present disclosure is shown by the claims rather than by the above description, and is intended to include meanings equivalent to the claims and all changes in the scope. While preferred aspects of the disclosure have been described above, it is to be understood that variations and modifications will be apparent to those skilled in the art without departing from the scope and spirit of the disclosure.

DESCRIPTION OF REFERENCE SYMBOLS 1 motor
2 rotor
3a, 3b, 3c stator
10a, 10b coil unit assembly
20aa, 20ab first busbar
20ba, 20bb second busbar
20ca, 20cb third busbar
21a, 21b bent portion
30a first coil unit
30b second coil unit
30c third coil unit
40a first split core
40b second split core
40c third split core
41a, 41b, 41c tooth
42aa, 42ab end surface of exposed portion of first split core
42ba, 42bb end surface of exposed portion of second split core
42ca, 42cb end surface of exposed portion of third split core
45 stator core
50a first insulator
50b second insulator
50c third insulator
51a, 51b, 51c cylindrical portion
52a, 52b, 52c inner flange portion
53a, 53b, 53c outer flange portion
55a first groove
55b second groove
55c third groove
56aa one end in circumferential direction of first groove of first insulator
56ab one end in circumferential direction of first groove of third insulator
56ba one end in circumferential direction of second groove of first insulator
56bb one end in circumferential direction of second groove of second insulator
56ca one end in circumferential direction of third groove of second insulator
56cb one end in circumferential direction of third groove of third insulator
57a, 57b wall portion
58a, 58b ceiling portion
59a, 59b floor portion
60a first coil
60b second coil
60c third coil
70a U-phase winding
70b V-phase winding
70c W-phase winding
71aa first end portion of U-phase winding
71ab second end portion of U-phase winding
71ba first end portion of V-phase winding
71bb second end portion of V-phase winding
71ca first end portion of W-phase winding
71cb second end portion of W-phase winding
80a, 80b terminal
AX axis

The invention claimed is:

1. A stator comprising:
a coil unit assembly that includes coil units annularly arranged; and
a busbar provided on an outer peripheral surface of the coil unit assembly,
wherein when a direction in which an axis of the stator extends is defined as an axial direction, a direction which is orthogonal to the axial direction and in which outer peripheral surface and inner peripheral surface of the stator face each other is a radial direction, and a direction along an outer periphery of the stator when viewed from the axial direction is a circumferential direction,
wherein the coil units each include a split core that includes a tooth that extends in the radial direction, an insulator mounted to overlap at least the tooth of the split core, and a coil that includes a winding wound around the tooth of the split core with the insulator interposed therebetween, and
wherein the coil units include a first coil unit, a second coil unit, and a third coil unit annularly and repeatedly arranged in sequence along the circumferential direction.

2. The stator according to claim 1, wherein the first coil unit includes a first split core, a first insulator, and a first coil that includes a U-phase winding, the second coil unit includes a second split core, a second insulator, and a second coil that includes a V-phase winding, and the third coil unit includes a third split core, a third insulator, and a third coil that includes a W-phase winding.

3. The stator according to claim 2, further comprising an outer end surface on an opposite side of the tooth in the radial direction of each of the first insulator, the second insulator, and the third insulator is exposed on the outer peripheral surface of the coil unit assembly.

4. The stator according to claim 3, wherein the outer end surface of each of the first insulator, the second insulator, and the third insulator is provided with a first groove, a second groove, and a third groove that extend in the circumferential direction over the first insulator, the second insulator, and the third insulator and are different from each other in position in the axial direction.

5. The stator according to claim 4, wherein:
the U-phase winding has a first end portion drawn toward one end in the circumferential direction of the first groove of the first insulator and a second end portion drawn toward one end in the circumferential direction of the second groove of the first insulator,
the V-phase winding has a first end portion drawn toward one end in the circumferential direction of the second groove of the second insulator and a second end portion drawn toward one end in the circumferential direction of the third groove of the second insulator, and
the W-phase winding has a first end portion drawn toward one end in the circumferential direction of the third groove of the third insulator and a second end portion drawn toward one end in the circumferential direction of the first groove of the third insulator.

6. The stator according to claim 5, wherein the busbar includes a first busbar provided in the first groove, a second busbar provided in the second groove, and a third busbar provided in the third groove.

7. The stator according to claim 6, wherein:
the second end portion of the W-phase winding and the first end portion of the U-phase winding are adjacent to each other in the circumferential direction and electrically connected to each other by the first busbar,
the second end portion of the U-phase winding and the first end portion of the V-phase winding are adjacent to each other in the circumferential direction and electrically connected to each other by the second busbar,
the second end portion of the V-phase winding and the first end portion of the W-phase winding are adjacent to each other in the circumferential direction and electrically connected to each other by the third busbar, and
the U-phase winding, the V-phase winding, and the W-phase winding form a delta connection with parallel circuits in respective phases.

8. The stator according to claim 7, wherein the busbar has a pair of bent portions adjacent to each other in the circumferential direction, and
end portions of two of the windings adjacent to each other in the circumferential direction are sandwiched by the pair of bent portions in the circumferential direction.

9. The stator according to claim 7, wherein an end portion of the winding is connected to a terminal provided to the insulator and electrically connected to the busbar with the terminal interposed therebetween.

10. The stator according to claim 7, wherein the insulator is provided with circumferential positioning means for performing positioning in the circumferential direction of an end portion of the winding.

11. The stator according to claim 7, wherein the insulator is provided with axial positioning means for performing positioning in the axial direction of an end portion of the winding.

12. The stator according to claim 7, wherein in the radial direction, an outer end, located on an opposite side of an inner peripheral surface of the coil unit assembly, of the busbar is located closer to the inner peripheral surface of the coil unit assembly than an outer end of the outer peripheral surface of the coil unit assembly is.

13. The stator according to claim 1, wherein the busbar is annular when viewed from the axial direction.

14. The stator according to claim 1, wherein the busbar is formed into an annular shape with which both ends of a single conductor are brought into contact.

15. The stator according to claim 1, wherein the busbar contains copper.

16. The stator according to claim 1, wherein the busbar includes a conductive spring material.

17. A motor comprising:
a stator comprising:
a coil unit assembly that includes coil units annularly arranged; and
a busbar provided on an outer peripheral surface of the coil unit assembly,
wherein when a direction in which an axis of the stator extends is defined as an axial direction, a direction which is orthogonal to the axial direction and in which outer peripheral surface and inner peripheral surface of the stator face each other is a radial direction, and a direction along an outer periphery of the stator when viewed from the axial direction is a circumferential direction,
wherein the coil units each include a split core that includes a tooth that extends in the radial direction, an insulator mounted to overlap at least the tooth of the split core, and a coil that includes a winding wound around the tooth of the split core with the insulator interposed therebetween, and
wherein the coil units include a first coil unit, a second coil unit, and a third coil unit annularly and repeatedly arranged in sequence along the circumferential direction; and
a rotor provided to face an inner peripheral surface of the stator.

18. The motor according to claim 17, wherein the first coil unit includes a first split core, a first insulator, and a first coil that includes a U-phase winding, the second coil unit includes a second split core, a second insulator, and a second coil that includes a V-phase winding, and the third coil unit includes a third split core, a third insulator, and a third coil that includes a W-phase winding.

19. The motor according to claim 18, further comprising an outer end surface on an opposite side of the tooth in the radial direction of each of the first insulator, the second insulator, and the third insulator is exposed on the outer peripheral surface of the coil unit assembly.

20. The motor according to claim 19, wherein the outer end surface of each of the first insulator, the second insulator, and the third insulator is provided with a first groove, a second groove, and a third groove that extend in the circumferential direction over the first insulator, the second insulator, and the third insulator and are different from each other in position in the axial direction.

* * * * *